US012585642B2

(12) United States Patent　　(10) Patent No.: US 12,585,642 B2
Kaushal et al.　　(45) Date of Patent: Mar. 24, 2026

(54) NATURAL LANGUAGE INTERFACE FOR QUERYING CLOUD SECURITY LOGS

(71) Applicant: Zscaler, Inc., San Jose, CA (US)

(72) Inventors: Jasbir Kaushal, Sunnyvale, CA (US);
Shreya Goyal, Mohali (IN); Pushkar Waghulde, San Jose, CA (US);
Shriyash Shete, Bloomington, IN (US);
Raj Krishna, San Jose, CA (US);
Valentin Khechinashvili, Alamo, CA (US)

(73) Assignee: Zscaler, Inc., San Jose, CA (US)

( * ) Notice: Subject to any disclaimer, the term of this patent is extended or adjusted under 35 U.S.C. 154(b) by 256 days.

(21) Appl. No.: 18/472,066

(22) Filed: Sep. 21, 2023

(65) Prior Publication Data

US 2024/0419657 A1　　Dec. 19, 2024

Related U.S. Application Data

(60) Provisional application No. 63/507,980, filed on Jun. 13, 2023.

(51) Int. Cl.
| | |
|---|---|
| *G06F 16/242* | (2019.01) |
| *G06F 16/248* | (2019.01) |
| *G06F 16/334* | (2025.01) |
| *G06F 16/335* | (2019.01) |
| *G06F 16/34* | (2019.01) |
| *G06F 21/62* | (2013.01) |
| *G10L 15/26* | (2006.01) |

(52) U.S. Cl.
CPC .......... *G06F 16/243* (2019.01); *G06F 16/248* (2019.01); *G06F 16/3344* (2019.01); *G06F* *16/335* (2019.01); *G06F 16/34* (2019.01); *G06F 21/6227* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 11,089,047 B1 | 8/2021 | Kaushal et al. | |
| 11,290,482 B2 | 3/2022 | Kaushal et al. | |
| 12,210,622 B1 * | 1/2025 | Zhang | G06F 21/554 |
| 2010/0250712 A1 * | 9/2010 | Ellison | G06F 3/0481 |
| | | | 709/224 |

(Continued)

*Primary Examiner* — Jeffrey R Swearingen
(74) *Attorney, Agent, or Firm* — Baratta Law PLLC; Lawrence A. Baratta, Jr.; Ryan Odessa

(57) ABSTRACT

Systems and methods for processing search queries are provided. A method, according to one implementation, includes a step of receiving a search request from an authorized user associated with an enterprise, wherein the search request includes natural language and is received via a query field of a User Interface (UI). The method also includes a step of parsing the search request to convert the natural language into one or more search parameters and a display format. Also, the method includes a step of retrieving log data from a private database associated with the enterprise, wherein the log data is retrieved in accordance with the one or more search parameters and is related to network activities associated with the enterprise. Furthermore, the method includes a step of displaying the log data on the UI in accordance with the display format.

20 Claims, 40 Drawing Sheets

(56)        References Cited

U.S. PATENT DOCUMENTS

| | | | |
|---|---|---|---|
| 2011/0184951 A1* | 7/2011 | Paparizos | G06F 16/951 |
| | | | 707/E17.089 |
| 2014/0143223 A1* | 5/2014 | Shi | G06F 16/3322 |
| | | | 707/706 |
| 2019/0272296 A1* | 9/2019 | Prakash | G06F 16/24534 |
| 2020/0137118 A1* | 4/2020 | Lyon | H04L 63/0218 |
| 2022/0046038 A1 | 2/2022 | Sinha et al. | |
| 2022/0109696 A1 | 4/2022 | Deshmukh et al. | |
| 2022/0121709 A1* | 4/2022 | Lehmann | G06F 11/3476 |
| 2022/0301562 A1* | 9/2022 | Robert Jose | G10L 15/28 |
| 2022/0311795 A1* | 9/2022 | Hutelmyer | H04L 63/1433 |
| 2024/0256582 A1* | 8/2024 | Jain | G06F 16/3329 |

* cited by examiner

500

PUBLIC CLOUD SERVICE      PRODUCTION ENVIRONMENT

502

CLIENT

514

PUBLIC LLM

512

GENERATIVE AI PLATFORM

IN-HOUSE LLM

516

①   ④   ⑤

504

SMUI

②

PROMPT

/zsapi/v1/reportData/web
/zsapi/v1/topData
/zsapi/v1/transactionData

③

VECTOR DATABASE

506

SMCA

508

SMSM

510

520

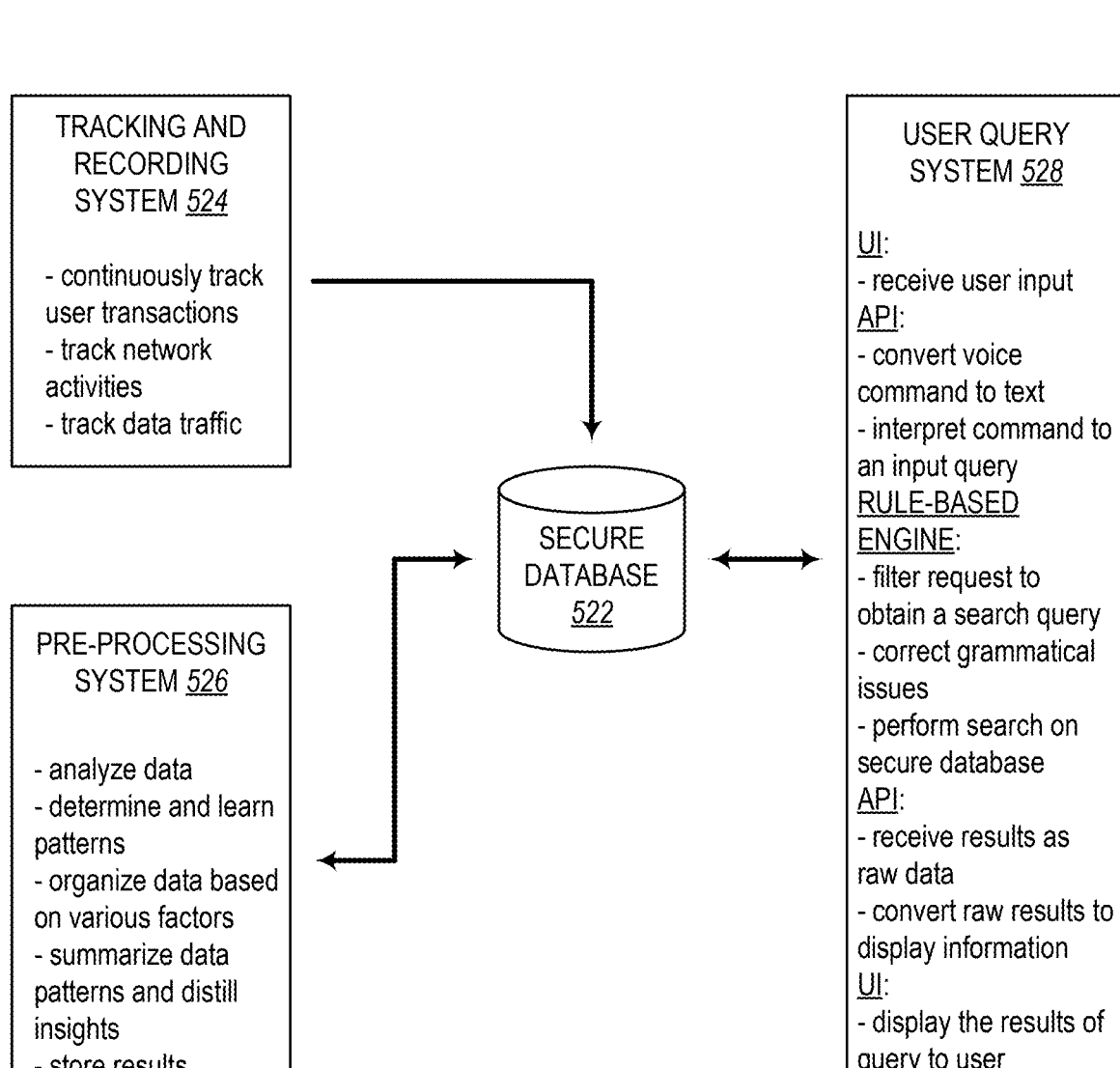

TRACKING AND RECORDING SYSTEM _524_

- continuously track user transactions
- track network activities
- track data traffic

PRE-PROCESSING SYSTEM _526_

- analyze data
- determine and learn patterns
- organize data based on various factors
- summarize data patterns and distill insights
- store results

SECURE DATABASE _522_

USER QUERY SYSTEM _528_

UI:
- receive user input
API:
- convert voice command to text
- interpret command to an input query
RULE-BASED ENGINE:
- filter request to obtain a search query
- correct grammatical issues
- perform search on secure database
API:
- receive results as raw data
- convert raw results to display information
UI:
- display the results of query to user

Help

ZChat

Insights  Logs  ZChat

Show me the transactions for the top
users browsing zscaler.com for today        584

Search        588

Suggested Queries

Show me a pie chart for top client ips
in bytes for this week

Show me a line chart for top url
categories for this week

Show me the protocol distribution for
current month in the form of bar chart

Show me the top users for the
current day in bytes

Previously Searched Queries

Show me the transactions of the top
users browsing zscaler.com for
this week

Start searching insights/logs using the
input box on the left

ZIA

Dashboard

Analytics

Policy

Administration

Activation

Search

Alerts

FIG. 12D

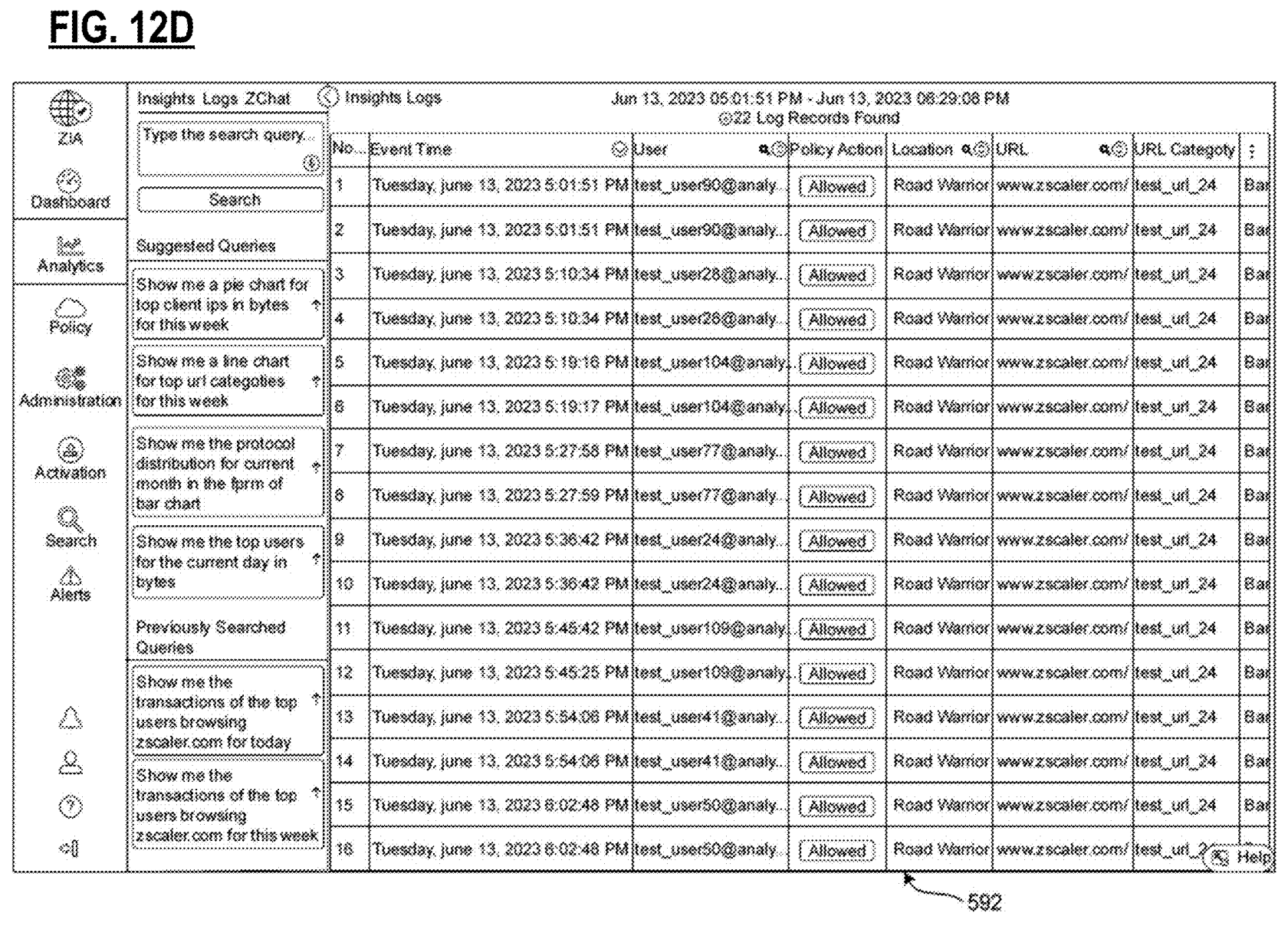

Insights Logs ZChat

Type the search query...

Search

Suggested Queries

Show me a pie chart for top client ips in bytes for this week

Show me a line chart for top url categories for this week

Show me the protocol distribution for current month in the form of bar chart

Show me the top users for the current day in bytes

Previously Searched Queries

Show me the transactions of the top users browsing zscaler.com for today

Show me the transactions of the top users browsing zscaler.com for this week

ZIA
Dashboard
Analytics
Policy
Administration
Activation
Search
Alerts

Insights Logs    Jun 13, 2023 05:01:51 PM - Jun 13, 2023 08:29:08 PM

22 Log Records Found

| No. | Event Time | User | Policy Action | Location | URL | URL Category | |
|-----|-----------|------|---------------|----------|-----|--------------|---|
| 1 | Tuesday, June 13, 2023 5:01:51 PM | test_user50@analy... | Allowed | Road Warrior | www.zscaler.com/ | test_url_24 | Ba... |
| 2 | Tuesday, June 13, 2023 5:01:51 PM | test_user90@analy... | Allowed | Road Warrior | www.zscaler.com/ | test_url_24 | Ba... |
| 3 | Tuesday, June 13, 2023 5:10:34 PM | test_user28@analy... | Allowed | Road Warrior | www.zscaler.com/ | test_url_24 | Ba... |
| 4 | Tuesday, June 13, 2023 5:10:34 PM | test_user28@analy... | Allowed | Road Warrior | www.zscaler.com/ | test_url_24 | Ba... |
| 5 | Tuesday, June 13, 2023 5:19:16 PM | test_user104@analy... | Allowed | Road Warrior | www.zscaler.com/ | test_url_24 | Ba... |
| 6 | Tuesday, June 13, 2023 5:19:17 PM | test_user104@analy... | Allowed | Road Warrior | www.zscaler.com/ | test_url_24 | Ba... |
| 7 | Tuesday, June 13, 2023 5:27:58 PM | test_user77@analy... | Allowed | Road Warrior | www.zscaler.com/ | test_url_24 | Ba... |
| 8 | Tuesday, June 13, 2023 5:27:59 PM | test_user77@analy... | Allowed | Road Warrior | www.zscaler.com/ | test_url_24 | Ba... |
| 9 | Tuesday, June 13, 2023 5:36:42 PM | test_user24@analy... | Allowed | Road Warrior | www.zscaler.com/ | test_url_24 | Ba... |
| 10 | Tuesday, June 13, 2023 5:36:42 PM | test_user24@analy... | Allowed | Road Warrior | www.zscaler.com/ | test_url_24 | Ba... |
| 11 | Tuesday, June 13, 2023 5:45:42 PM | test_user108@analy... | Allowed | Road Warrior | www.zscaler.com/ | test_url_24 | Ba... |
| 12 | Tuesday, June 13, 2023 5:45:25 PM | test_user108@analy... | Allowed | Road Warrior | www.zscaler.com/ | test_url_24 | Ba... |
| 13 | Tuesday, June 13, 2023 5:54:08 PM | test_user41@analy... | Allowed | Road Warrior | www.zscaler.com/ | test_url_24 | Ba... |
| 14 | Tuesday, June 13, 2023 5:54:08 PM | test_user41@analy... | Allowed | Road Warrior | www.zscaler.com/ | test_url_24 | Ba... |
| 15 | Tuesday, June 13, 2023 6:02:48 PM | test_user50@analy... | Allowed | Road Warrior | www.zscaler.com/ | test_url_24 | Ba... |
| 16 | Tuesday, June 13, 2023 6:02:48 PM | test_user50@analy... | Allowed | Road Warrior | www.zscaler.com/ | test_url_24 | Ba... |

592

Help

Figure 12E:
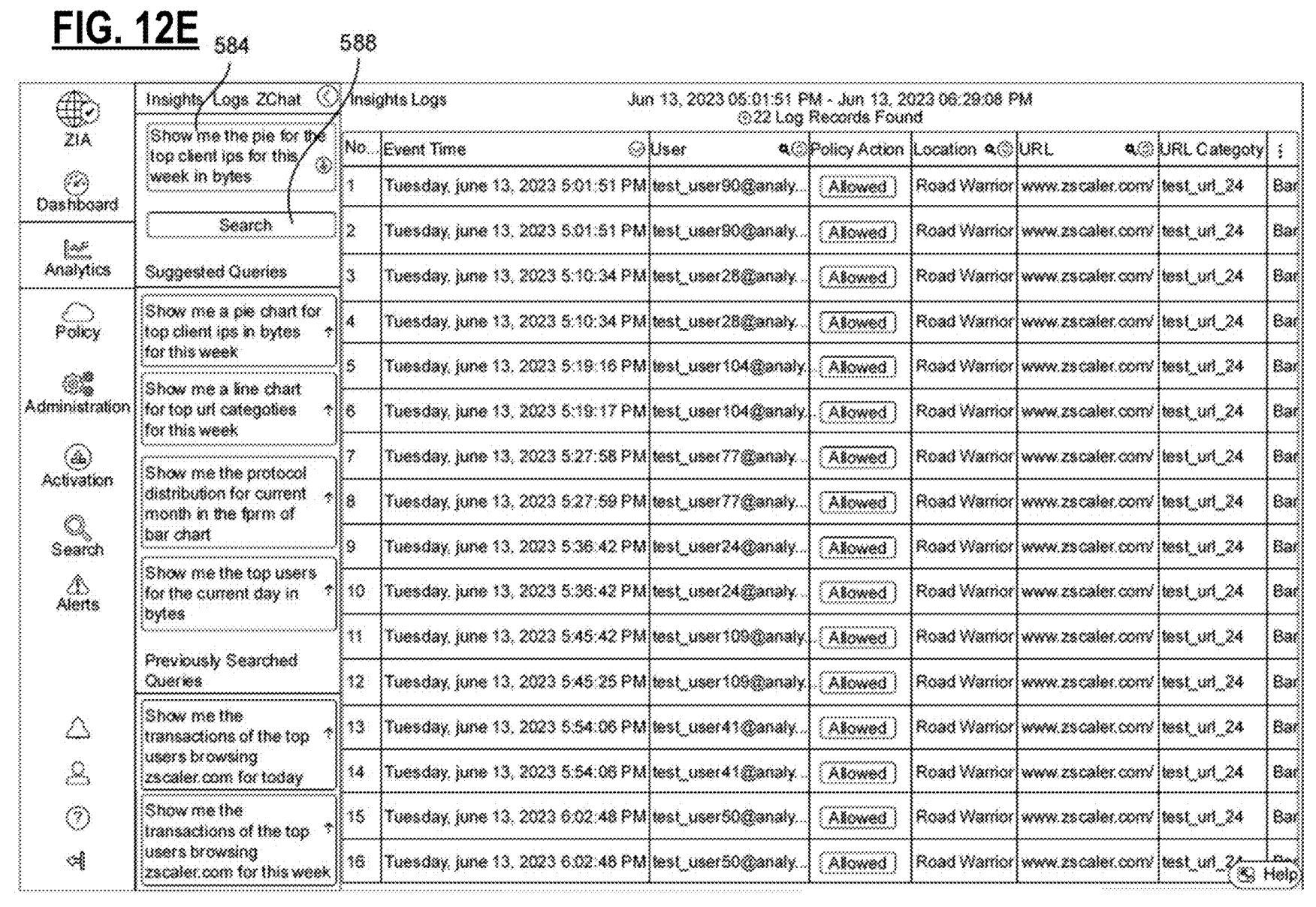

Insights Logs ZChat

Jun 13, 2023 05:01:51 PM - Jun 12, 2023 06:29:08 PM
22 Log Records Found

Show me the pie for the top client ips for this week in bytes

Search

Suggested Queries

Show me a pie chart for top client ips in bytes for this week

Show me a line chart for top url categories for this week

Show me the protocol distribution for current month in the form of bar chart

Show me the top users for the current day in bytes

Previously Searched Queries

Show me the transactions of the top users browsing zscaler.com for today

Show me the transactions of the top users browsing zscaler.com for this week

Insights Logs

| No. | Event Time | User | Policy Action | Location | URL | URL Category | : |
|---|---|---|---|---|---|---|---|
| 1 | Tuesday, june 13, 2023 5:01:51 PM | test_user90@analy.. | Allowed | Road Warrior | www.zscaler.com/ | test_url_24 | Bar.. |
| 2 | Tuesday, june 13, 2023 5:01:51 PM | test_user90@analy.. | Allowed | Road Warrior | www.zscaler.com/ | test_url_24 | Bar.. |
| 3 | Tuesday, june 13, 2023 5:10:34 PM | test_user28@analy.. | Allowed | Road Warrior | www.zscaler.com/ | test_url_24 | Bar.. |
| 4 | Tuesday, june 13, 2023 5:10:34 PM | test_user28@analy.. | Allowed | Road Warrior | www.zscaler.com/ | test_url_24 | Bar.. |
| 5 | Tuesday, june 13, 2023 5:19:16 PM | test_user104@analy.. | Allowed | Road Warrior | www.zscaler.com/ | test_url_24 | Bar.. |
| 6 | Tuesday, june 13, 2023 5:19:17 PM | test_user104@analy.. | Allowed | Road Warrior | www.zscaler.com/ | test_url_24 | Bar.. |
| 7 | Tuesday, june 13, 2023 5:27:58 PM | test_user77@analy.. | Allowed | Road Warrior | www.zscaler.com/ | test_url_24 | Bar.. |
| 8 | Tuesday, june 13, 2023 5:27:59 PM | test_user77@analy.. | Allowed | Road Warrior | www.zscaler.com/ | test_url_24 | Bar.. |
| 9 | Tuesday, june 13, 2023 5:36:42 PM | test_user24@analy.. | Allowed | Road Warrior | www.zscaler.com/ | test_url_24 | Bar.. |
| 10 | Tuesday, june 13, 2023 5:36:42 PM | test_user24@analy.. | Allowed | Road Warrior | www.zscaler.com/ | test_url_24 | Bar.. |
| 11 | Tuesday, june 13, 2023 5:45:42 PM | test_user108@analy.. | Allowed | Road Warrior | www.zscaler.com/ | test_url_24 | Bar.. |
| 12 | Tuesday, june 13, 2023 5:45:25 PM | test_user108@analy.. | Allowed | Road Warrior | www.zscaler.com/ | test_url_24 | Bar.. |
| 13 | Tuesday, june 13, 2023 5:54:08 PM | test_user41@analy.. | Allowed | Road Warrior | www.zscaler.com/ | test_url_24 | Bar.. |
| 14 | Tuesday, june 13, 2023 5:54:08 PM | test_user41@analy.. | Allowed | Road Warrior | www.zscaler.com/ | test_url_24 | Bar.. |
| 15 | Tuesday, june 13, 2023 6:02:48 PM | test_user50@analy.. | Allowed | Road Warrior | www.zscaler.com/ | test_url_24 | Bar.. |
| 16 | Tuesday, june 13, 2023 6:02:48 PM | test_user50@analy.. | Allowed | Road Warrior | www.zscaler.com/ | test_url_2.. | Help |

ZIA
Dashboard
Analytics
Policy
Administration
Activation
Search
Alerts

FIG. 12H

Insights   Logs   ZChat

⊘ Web Insights                                                              ⓘ Help Type the search query...

Search

Suggested Queries

Show me a pie chart for top client ips
in bytes for this week                              ⬦

Show me a line chart for top url
categories for this week                            ⬦

Show me the protocol distribution for
current month in the form of bar chart²             ⬦

Show me the top users for the
current day in bytes                                ⬦

Previously Searched Queries

Show me the pie chart of the top
client ips for this week in bytes                   ⬦

Show me the transactions of the top
users browsing zscaler.com
for today                                           ⬦

Show me the transactions of the top
users browsing zscaler.com
for this week                                       ⬦

588 ⟍

|  |  |
|---|---|
| 1321.0 K | Non Categorizable |
| 61.4 K | TLD_123 |
| 32.5 K | Miscellaneous or Unknown |
| 5.2 K | MS Defender Unsanctioned Apps |
| 2.7 K | Corporate Marketing |
| 2.4 K | Science/Tech |
| 1.8 K | Botnet Callback |
| 1.6 K | Web Search |
| 1.4 K | Reference Sites |
| 989 | Professional Services |
| 928 | Video Streaming |
| 913 | test_url_24 |
| 841 | temp_url_Lakash |
| 615 | temp_custom_1 |
| 495 | News and Media |
| 385 | Continuing Education/Colleges |
| 240 | Malicious Content |
| 14 | Internet Services |

600

ZIA

Dashboard

Analytics

Policy

Administration

Activation

Search

Alerts

FIG. 12J

Insights  Logs  ZChat

Show me the top users for the current day invites

Search

Suggested Queries

Show me a pie chart for top client ips in bytes for this week ↑

Show me a line chart for top url categories for this week ↑

Show me the protocol distribution for current month in the form of bar chart ↑

Show me the top users for the current day in bytes ↑

Previously Searched Queries

Show me a bar chart for the top categories for this week ↑

Show me the pie chart of the top client ips for this week in bytes ↑

Show me the transactions of the top users browsing zscaler.com for today ↑

Show me the transactions of the top users browsing zscaler.com for this week

ZIA
Dashboard
Analytics
Policy
Administration
Activation
Search
Alerts

Web Insights

584

| | |
|---|---|
| 1321.0 K | Non Categorizable |
| 01.4 K | TLD_123 |
| 32.5 K | Miscellaneous or Unknown |
| 5.2 K | MS Defender Unsanctioned Apps |
| 2.7 K | Corporate Marketing |
| 2.4 K | Science/Tech |
| 1.8 K | Botnet Callback |
| 1.8 K | Web Search |
| 1.4 K | Reference Sites |
| 998 | Professional Services |
| 928 | Video Streaming |
| 913 | test_url_24 |
| 841 | temp_url_akash |
| 615 | temp_custom_1 |
| 495 | News and Media |
| 365 | Continuing Education/Colleges |
| 240 | Malicious Content |
| 14 | Internet Services |

Help

FIG. 12K

Insights  Logs  ZChat

Show me the top users for the current day invites

Search

Suggested Queries

Show me a pie chart for top client ips in bytes for this week

Show me a line chart for top url categories for this week

Show me the protocol distribution for current month in the fprm of bar chart

Show me the top users for the current day in bytes

Previously Searched Queries

Show me a bar chart for the top categories for this week

Show me the pie chart of the top client ips for this week in bytes

Show me the transactions of the top users browsing zscaler.com for today

Show me the transactions of the top users browsing zscaler.com for this week

ZIA
Dashboard
Analytics
Policy
Administration
Activation
Search
Alerts

Web Insights

602

| | |
|---|---|
| 1321.0 K | Non Categorizable |
| 61.4 K | TLD_123 |
| 32.5 K | Miscellaneous or Unknown |
| 5.2 K | MS Defender Unsanctioned Apps |
| 2.7 K | Corporate Marketing |
| 2.4 K | Science/Tech |
| 1.8 K | Botnet Callback |
| 1.0 K | Web Search |
| 1.4 K | Reference Sites |
| 988 | Professional Services |
| 928 | Video Streaming |
| 913 | test_url_24 |
| 841 | temp_url_Lakash |
| 615 | temp_custom_1 |
| 495 | News and Media |
| 365 | Continuing Education/Colleges |
| 240 | Malicious Content |
| 14 | Internet Services |

Help

FIG. 12M

Insights Logs ZChat

Type the search query...

Search

Web Insights

Suggested Queries

Show me a pie chart for top client ips in bytes for this week

Show me a line chart for top url categories for this week

Show me the protocol distribution for current month in the form of bar chart

Show me the top users for the current day in bytes

Previously Searched Queries

Show me a bar chart for the top categories for this week

Show me the pie chart of the top client ips for this week in bytes

Show me the transactions of the top users browsing zscaler.com for today

Show me the transactions of the top users browsing zscaler.com for this week

ZIA
Dashboard
Analytics
Policy
Administration
Activation
Search
Alerts

| | |
|---|---|
| test_user45@analytics.net | 2.3 MB |
| test_user75@analytics.net | 2.2 MB |
| test_user96@analytics.net | 2.1 MB |
| test_user14@analytics.net | 2.0 MB |
| test_user53@analytics.net | 2.0 MB |
| test_user110@analytics.net | 2.0 MB |
| test_user86@analytics.net | 1.9 MB |
| test_user53@analytics.net | 1.9 MB |
| test_user50@analytics.net | 1.9 MB |
| test_user55@analytics.net | 1.9 MB |
| test_user105@analytics.net | 1.8 MB |
| test_user34@analytics.net | 1.8 MB |
| test_user4@analytics.net | 1.7 MB |
| test_user75@analytics.net | 1.6 MB |
| test_user104@analytics.net | 1.6 MB |
| test_user1@analytics.net | 1.6 MB |
| test_user81@analytics.net | 1.6 MB |
| test_user119@analytics.net | 1.6 MB |
| test_user46@analytics.net | 1.6 MB |
| test_user45@analytics.net | 1.6 MB |
| test_user22@analytics.net | 1.5 MB |
| test_user5@analytics.net | 1.5 MB |
| test_user24@analytics.net | 1.5 MB |
| test_user54@analytics.net | 1.5 MB |
| test_user26@analytics.net | 1.5 MB |
| test_user115@analytics.net | 464.2 KB |
| test_user117@analytics.net | 443.4 KB |

Help

FIG. 13C

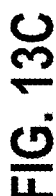

ZChat

Insights  Logs  ZChat

584 — Show me the transaction to youtube.com in the last 7 days

588 — Search

Suggested Queries

Show me a pie chart for top client ips in bytes for this week

Show me a line chart for top url categories for this week

Show me the protocol distribution for current month in the from of bar chart

Show me the top users for the current day in bytes

Previously Searched Queries

Show me the transaction to youtube.com in the last 7 days

Show me the protocol distribution for current month in the from of bar chart

Show me the transaction to youtube.com in the last week

Show me the transaction to youtube.com in the month of may

ZIA

Dashboard

Analytics

Policy

Administration

Activation

Search

Alerts

Start searching insights/apps using the input box on the left

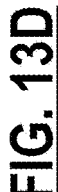

Insights Logs

Insights Logs ZChat

Type the search query...

Search

Suggested Queries

Show me a pie chart for top client ips in bytes for this week

Show me a line chart for top url categories for this week

Show me the protocol distribution for current month in the from of bar chart

Show me the top users for the current day in bytes

Previously Searched Queries

Show me the transaction to youtube.com in the last 7 days

Show me the transaction to youtube.com in the last 7 days

Show me the protocol distribution for current month in the from of bar chart

Show me the transaction to youtube.com in the last week

Show me the transaction to youtube.com in the month of may

Receiving for Tuesday, May 30, 2023 02:27:31 PM
Number of records fetched so far: 3408

Cross   Cancel

00:27                    01:39

ZIA
Dashboard
Analytics
Policy
Administration
Activation
Search
Alerts

Help

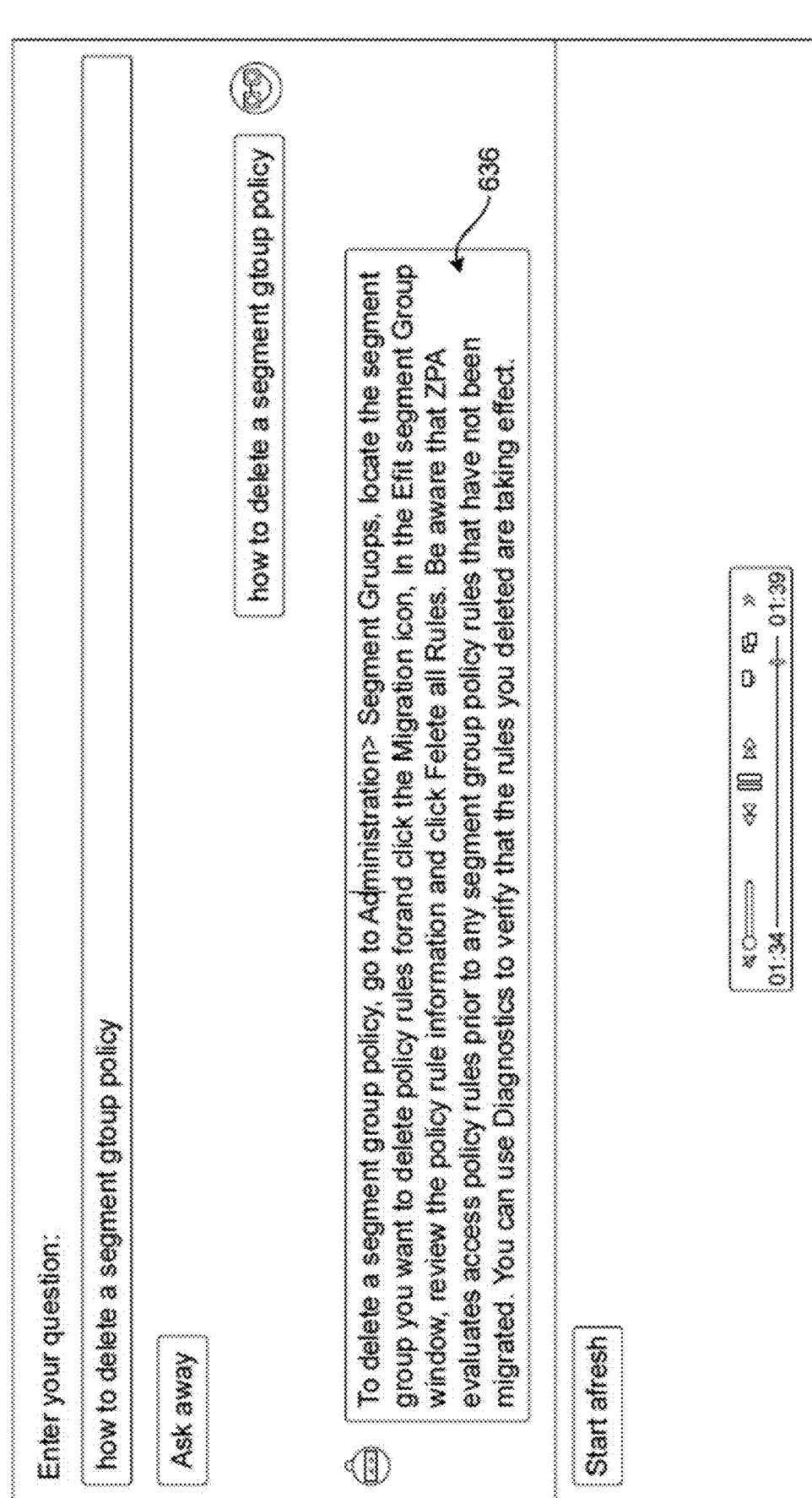

Enter your question:

how to delete a segment group policy

Ask away how to delete a segment group policy

636

To delete a segment group policy, go to Administration> Segment Gruops, locate the segment group you want to delete policy rules forand click the Migration icon, In the Efti segment Group window, review the policy rule information and click Felete all Rules. Be aware that ZPA evaluates access policy rules prior to any segment group policy rules that have not been migrated. You can use Diagnostics to verify that the rules you deleted are taking effect.

Start afresh

Web Insights

642

Insights   Logs   ZChat

Jsfsdhsskifjhfsks

Search

Suggestions   Saved Queries

Show me the transactions to facebook.com for the current week

Show me pie chart for top 100 client ip for today in bytes

Show me line chart for top url categories for this distributionsa

Show me today's transactions originating from 1038.112.102

Previously Searched Queries

ZIA

Dashboard

Analytics

Policy

Administration

Activation

Search

How can I help?

Start searching insights using the input box on the left

Help

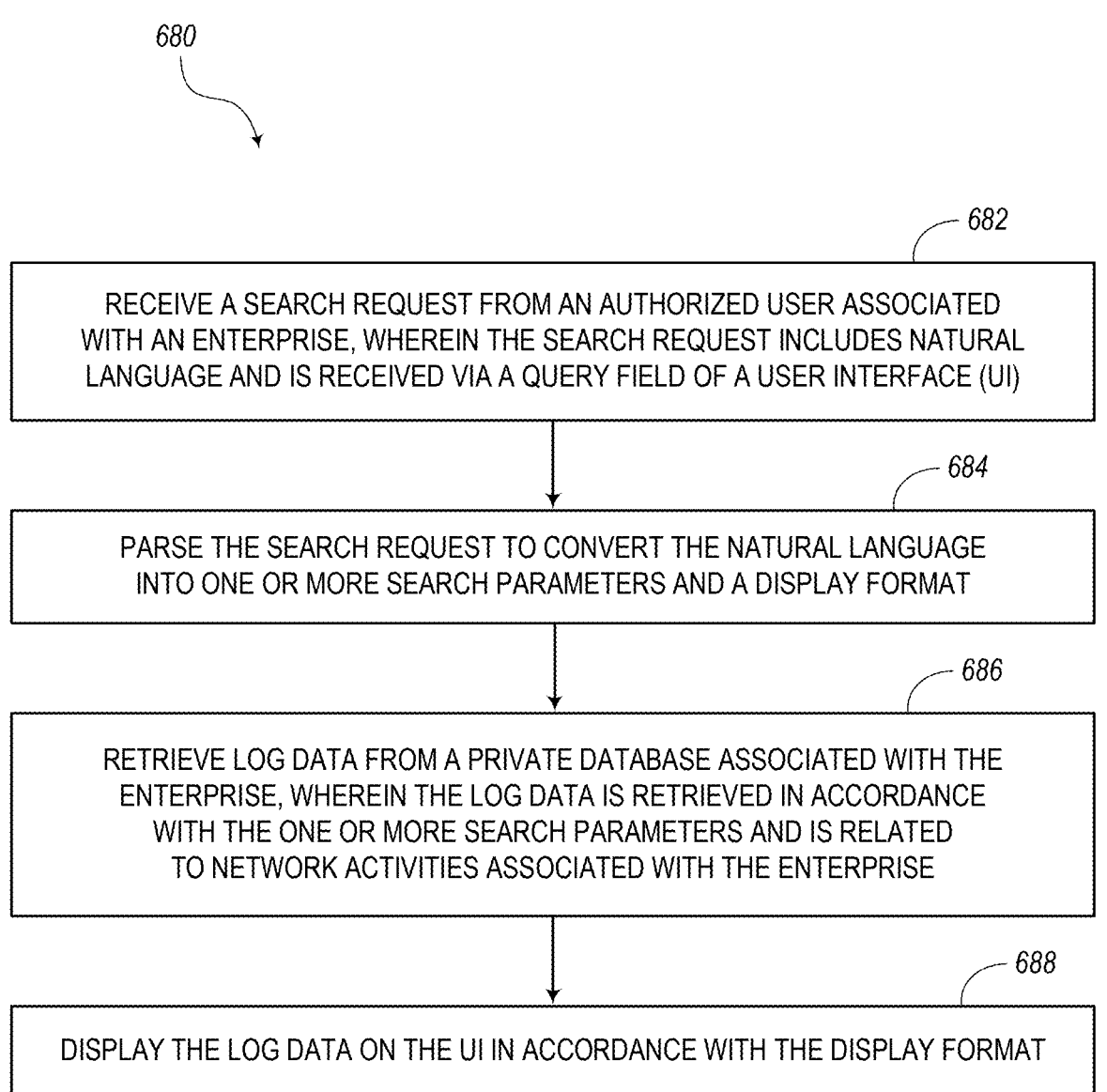

*680*

*682*

RECEIVE A SEARCH REQUEST FROM AN AUTHORIZED USER ASSOCIATED WITH AN ENTERPRISE, WHEREIN THE SEARCH REQUEST INCLUDES NATURAL LANGUAGE AND IS RECEIVED VIA A QUERY FIELD OF A USER INTERFACE (UI)

*684*

PARSE THE SEARCH REQUEST TO CONVERT THE NATURAL LANGUAGE INTO ONE OR MORE SEARCH PARAMETERS AND A DISPLAY FORMAT

*686*

RETRIEVE LOG DATA FROM A PRIVATE DATABASE ASSOCIATED WITH THE ENTERPRISE, WHEREIN THE LOG DATA IS RETRIEVED IN ACCORDANCE WITH THE ONE OR MORE SEARCH PARAMETERS AND IS RELATED TO NETWORK ACTIVITIES ASSOCIATED WITH THE ENTERPRISE

*688*

DISPLAY THE LOG DATA ON THE UI IN ACCORDANCE WITH THE DISPLAY FORMAT

FIG. 17

NATURAL LANGUAGE INTERFACE FOR QUERYING CLOUD SECURITY LOGS

CROSS-REFERENCE TO RELATED APPLICATION

The present application claims the benefit of priority to Provisional App. No. 63/507,980, filed Jun. 13, 2023, the contents of which are incorporated by reference herein.

FIELD OF THE DISCLOSURE

The present disclosure relates generally to networking and computing. More particularly, the present disclosure relates to systems and methods for a natural language interface for querying logs in a cloud-based system.

BACKGROUND OF THE DISCLOSURE

Creating customized reports from logs can become extremely difficult when logs include large amounts of data. cloud-based systems can have transaction logs which include trillions of transactions with hundreds of millions of transactions being logged each day. Traditionally, users are required to spend a large amount of time selecting various filters and waiting for the logs to load to sort through the trillions of log data entries to get to the desired information. A system for creating customized reports is needed to allow users to easily receive desired data in a requested format. The present disclosure provides systems and methods for a natural language interface for querying logs in a cloud-based system.

BRIEF SUMMARY OF THE DISCLOSURE

The present disclosure provides systems and methods for a natural language interface for querying logs in a cloud-based system. Filtering through data associated with a cloud-based system can be extremely difficult. This is because cloud-based system logs can contain over 300 billion transactions every day. Because of the sheer size of these transaction logs, it is difficult to produce customized reports with specific data. In various embodiments, the systems and methods include training and utilizing a machine learning system that is adapted to convert natural language into a visualization of desired data. More particularly, the present systems and methods convert natural language into various filters necessary for creating a customized report from the log data.

The present disclosure is further directed to systems and methods for performing a search query. In one implementation, a method includes the step of receiving a search request from an authorized user associated with an enterprise. The search request includes natural language and is received via a query field of a User Interface (UI). Furthermore, the method includes the step of parsing the search request to convert the natural language into one or more search parameters and a display format. The method also includes the step of retrieving log data from a private database associated with the enterprise. The log data is retrieved in accordance with the one or more search parameters and is related to network activities associated with the enterprise. Also, the method includes the step of displaying the log data on the UI in accordance with the display format.

The present disclosure is further directed to systems and methods for creating a UI that enables a user to perform a search query. In one implementation, a method includes displaying a UI having a search request section and a dashboard section. The search request section is configured to allow an admin associated with an enterprise to enter a search query using natural language. Also, the dashboard section is configured to display results of the search query. Upon receiving a search query from the admin via the search request section, the method includes the step of retrieving log data from a private database associated with the enterprise according to search parameters parsed from the search query. Then, the method includes displaying the log data in the dashboard section of the UI according to a display format parsed from the search query.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

FIG. 8 is a block diagram illustrating an embodiment of a data retrieval system.

FIGS. 12A-12M show example screenshots of Chat pages when a Chat tab is selected.

FIGS. 13A-13E show example screenshots of additional Chat pages.

FIGS. 15A and 15B show example screenshots of a search query system using generative Artificial Intelligence (generative AI).

FIGS. 16A-16E show example screenshots of additional UI workflows for performing queries on a private database.

FIG. 17 is a flow diagram illustrating a method for enabling a user to perform a search query.

DETAILED DESCRIPTION OF THE DISCLOSURE

Again, the present disclosure relates to systems and methods for a natural language interface for querying logs in a cloud-based system. The present systems are adapted to take a natural language string provided by the user by way of one or more methods, and after converting it into a format that is understandable by the log, provide the converted input to the log. The log is then adapted to provide the customized report based on the natural language string, and provide a graphical representation based on a requested format.

Example Cloud-Based System Architecture

Figure 1A:
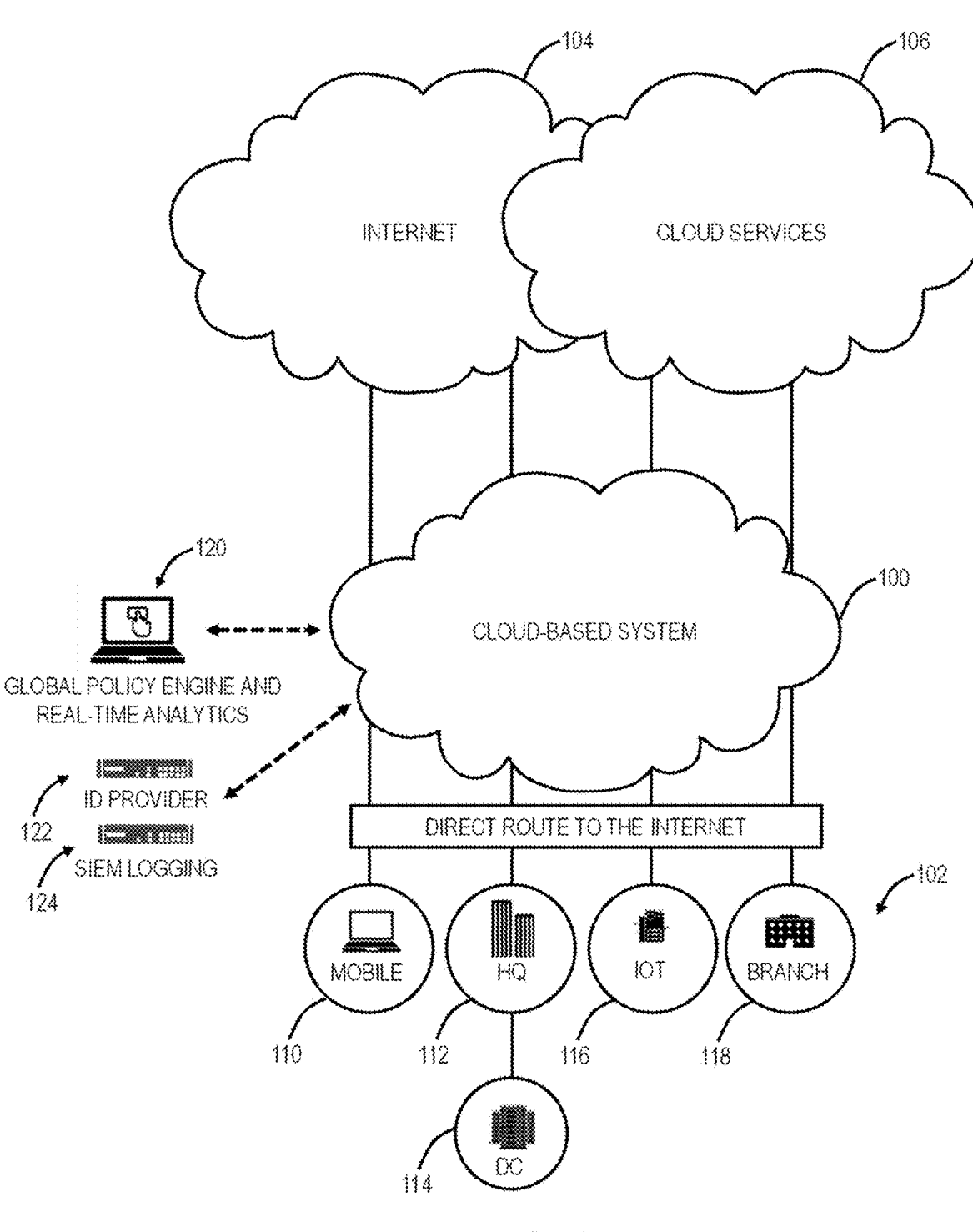
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
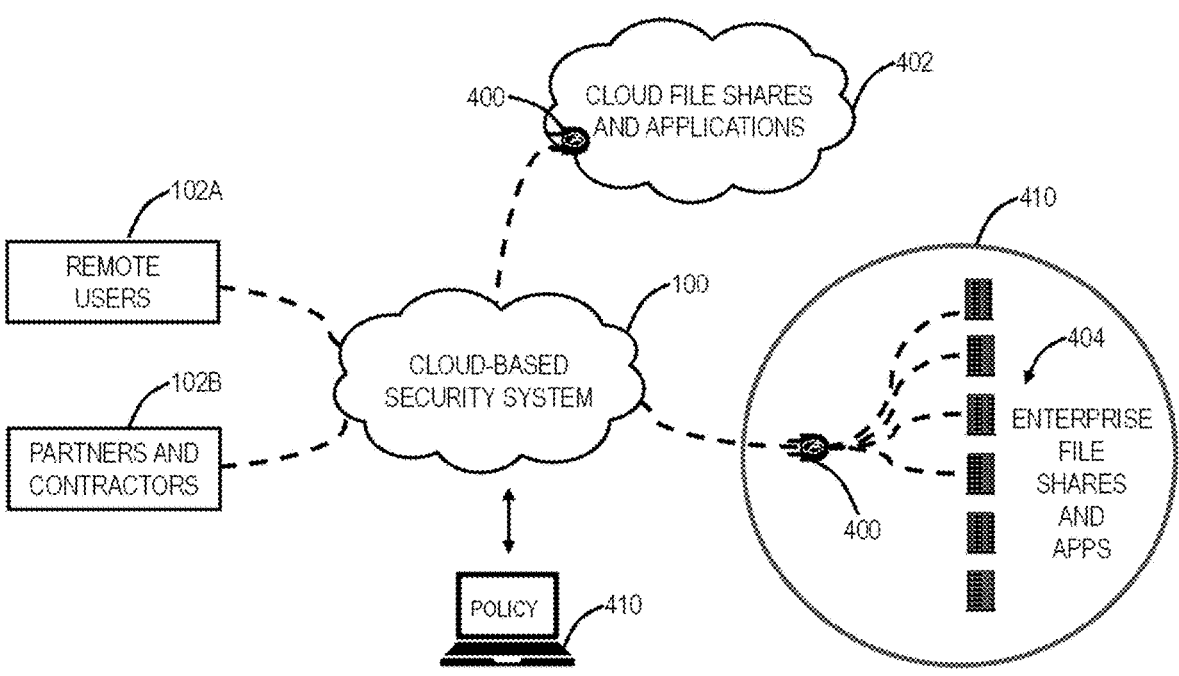
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. Also, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
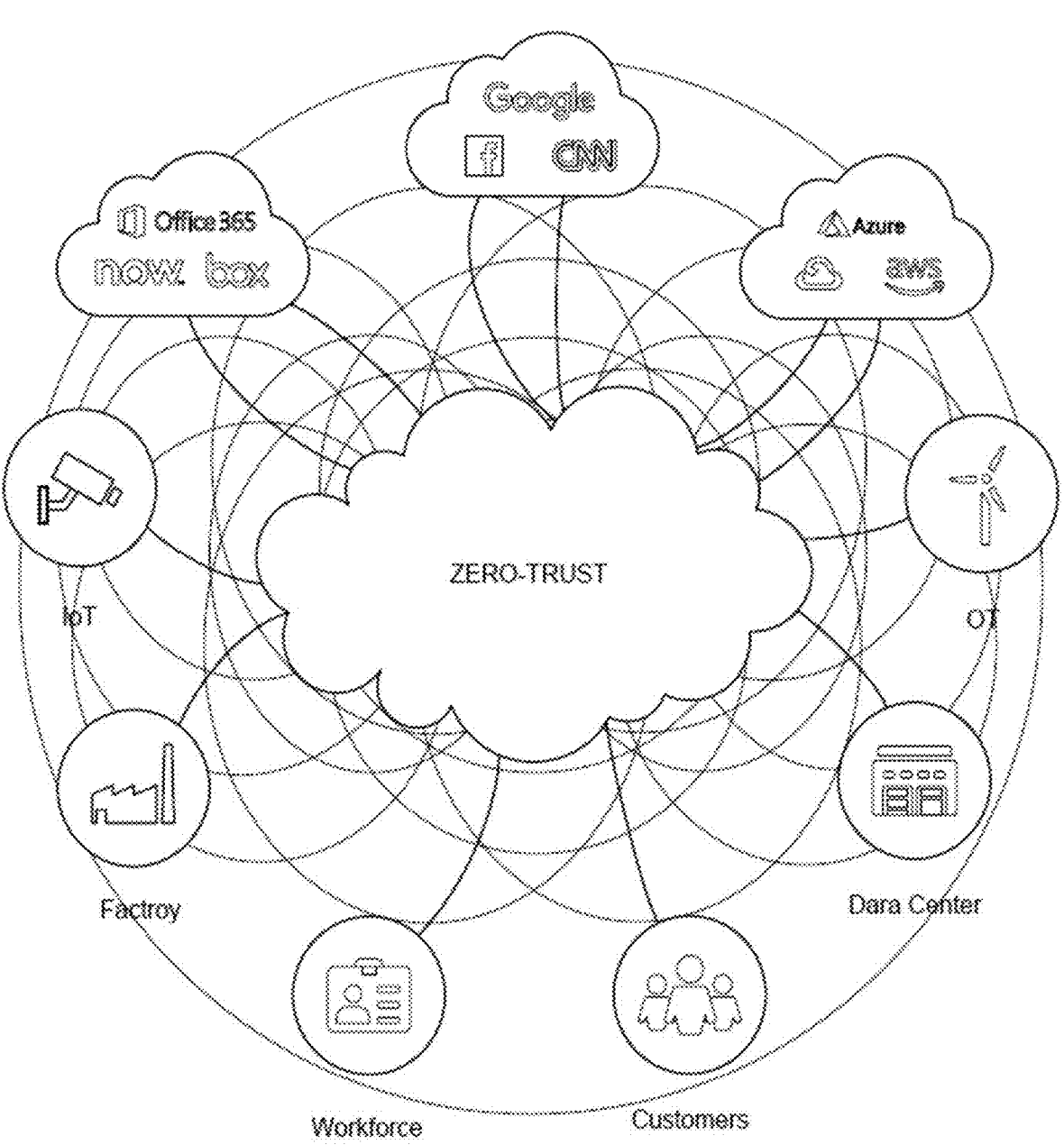
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
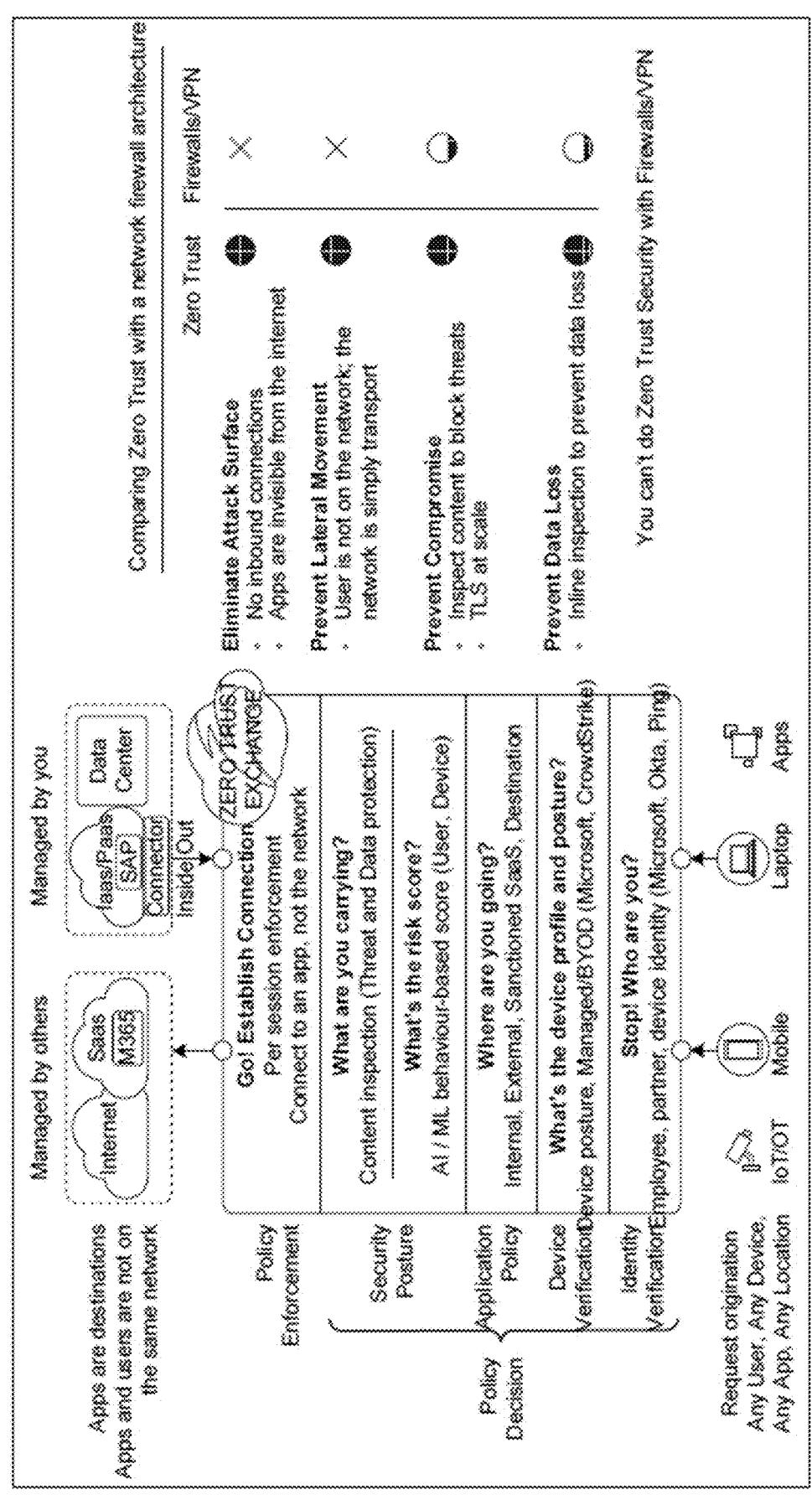
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
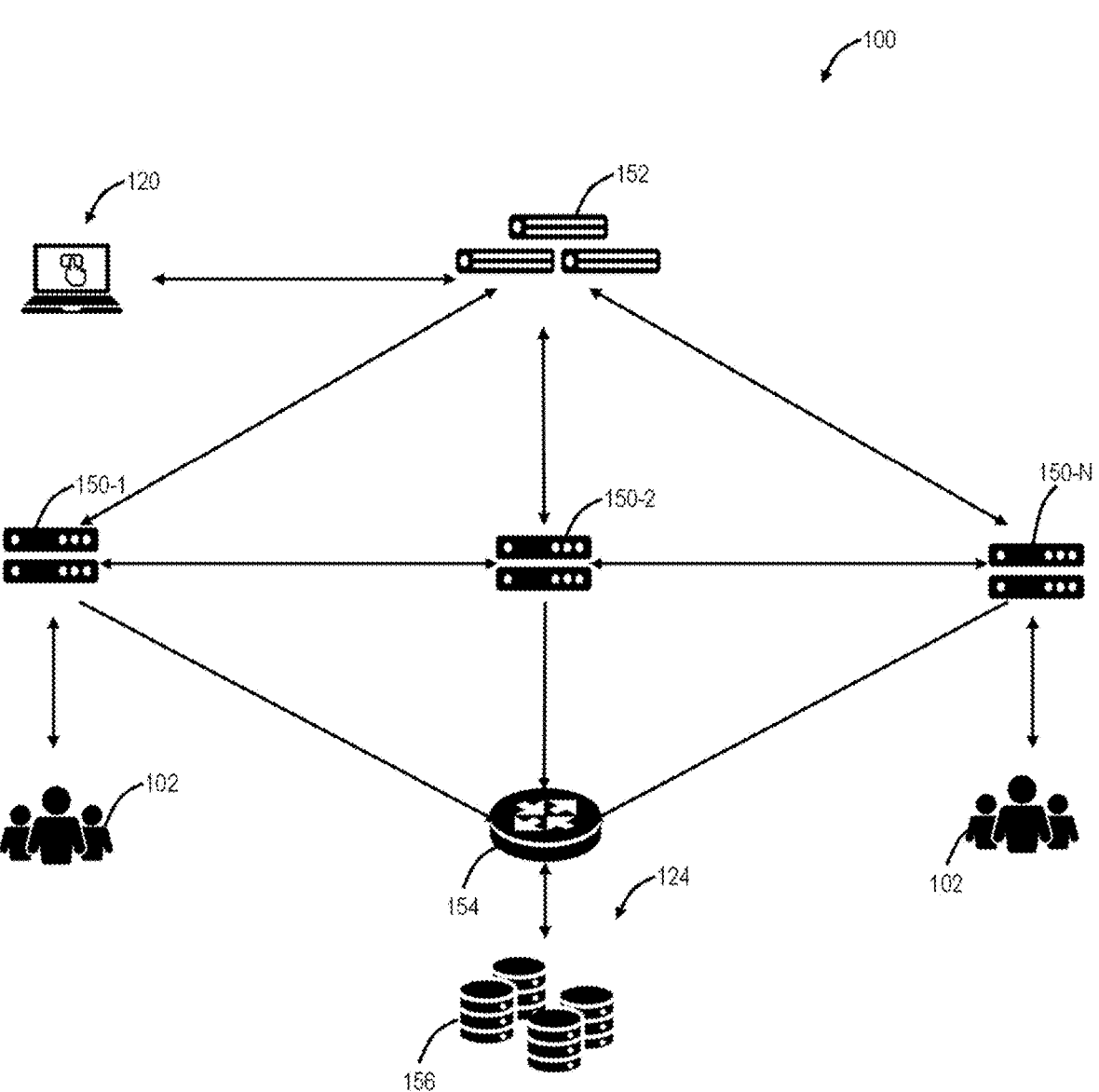
FIG. 2 is a network diagram of an example implementation of the cloud-based system.
Figure 4:
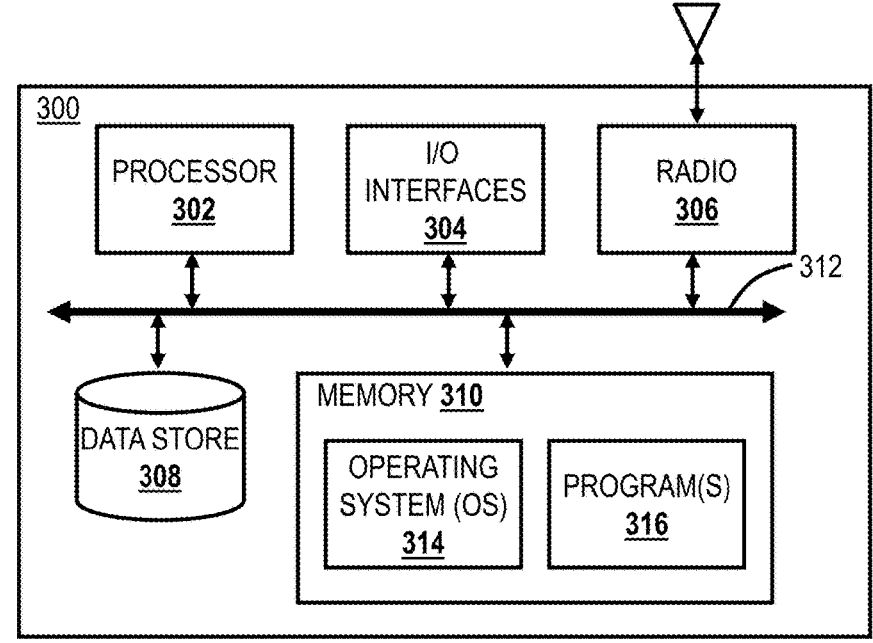

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
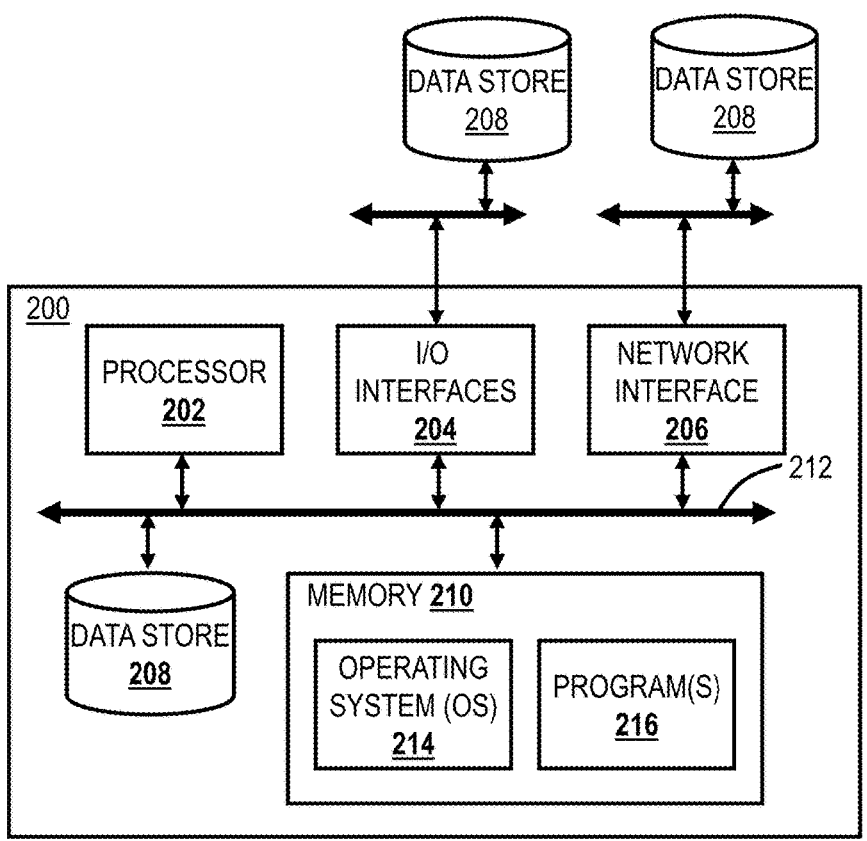
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304,

306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402 and 404 is that the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

Digital Experience Monitoring

Figure 6:
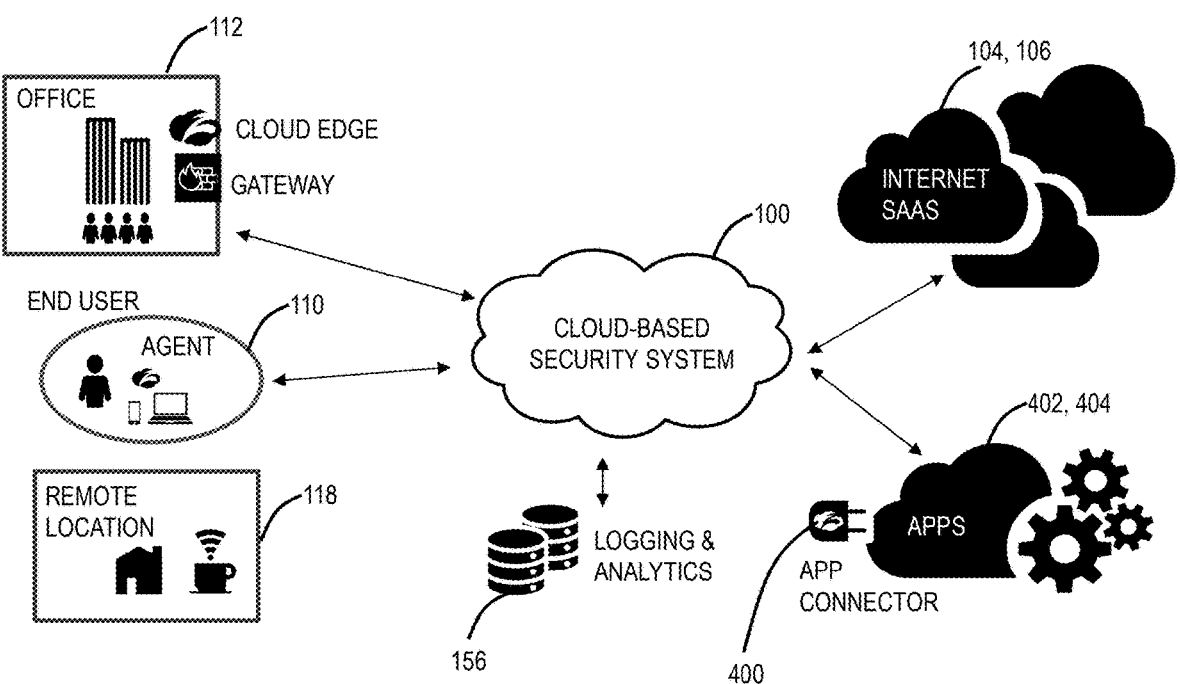
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Natural Language Interface for Querying Logs

The present disclosure provides systems and methods for a natural language interface for querying logs in a cloud-based system. Filtering through data associated with a cloud-based system can be extremely difficult. This is because cloud-based system logs can contain over 300 billion transactions every day. Because of the sheer size of these transaction logs, it is difficult to produce customized reports with specific data. In various embodiments, the systems and methods include training and utilizing a machine learning system that is adapted to convert natural language into a visualization of desired data.

More particularly, the present systems and methods convert natural language into the various filters necessary for creating the customized report. That is, the machine learning model is adapted to take the natural language input and convert it in such a way as to allow the log to understand the request. The subsequent visualization includes the specific data requested by the user in the format requested by the user. In various embodiments, the present systems provide a User Interface (UI) for allowing users to provide the inputs and for providing the visualizations based on the inputs.

In an example use case, a user may want to create a customized report from the log data. For example, a user may want to determine how many users have accessed a specific application on a specific day. Traditionally, a user would have to spend a large amount of time selecting various filters and waiting for the logs to load to sort through the trillions of log data entries to get to the desired information. Again, this is extremely time consuming because of the amount of log data experienced by cloud-based systems.

In an embodiment, the present systems are adapted to take a voice input for providing the model with the natural language input. That is, the present systems include a UI which includes a voice input feature. Alternatively, a user can type the natural language input in a search bar, select a recommended input, and/or select a previously used input. Recommended inputs can be inputs that the system recommends to users based on the popularity of previous searches.

The model is adapted to take the natural language string provided by the user by way of the aforementioned methods, and after converting it into a format that is understandable by the log, provide the converted input to the log. The log is then adapted to provide the customized report based on the natural language string, and provide a graphical representation based on a requested format. The requested format can be part of the natural language string provided by the user.

More particularly, the system uses the natural language input to determine what type of graphical representation the output should be structured as. For example, a user can provide a natural language input of "show me a pie chart of the top one hundred client IPs for today in bytes" and the system will provide a pie chart of the top 100 IPs (or other quantitative amount) used today in bytes.

Again, the system is adapted, via the UI, to provide suggestions for customized reports. These suggestions can be based on historically popular requests and the like.

In an embodiment, the system is further adapted to provide a display of the filters used to create the customized report. That is, after the report is created, the system shows what filters were applied to the log based on the natural language input. In an embodiment, the systems are further adapted to allow a user to provide feedback based on the filters the system provided to the log. For example, a user can inspect the filters and indicate if they are accurate or not, allowing the model to be further trained to become more accurate.

Natural Language Interface for Cloud-Based Query

Figure 7:
FIG. 7 is a flow diagram for a natural language interface for querying logs in a cloud-based system.

FIG. 7 is a flow diagram illustrating an embodiment of a process 500 using a natural language interface for querying logs in a cloud-based system. The process 500 includes a production environment and a public cloud service. In the production environment, the process 500 involves actions by a client 502, a UI 504, a vector database 506, a Central Authority (CA) 508, and a Service Manager (SM) 510. In this embodiment, the public cloud service includes a generative AI platform 512 (e.g., a generative AI platform) on the public cloud, an OpenAI service 514 (e.g., Azure OpenAI service), and one or more in-house Large Language Models (LLMs) 516.

In a first step, a client 502 (or user) can provide a prompt (or request) to an API prompt portion of the UI 504. The client 502 may input a natural language prompt into the system via various input methods described herein. Alternatively, the client 502 may enter a query or request in textual form within an input box. If needed, the API prompt portion converts the natural language to an input that the log can use to provide a customized report.

In a second step, the API prompt portion can turn (or convert) the prompt into a generic/API request, with no customer information and provide the prompt to the generative AI platform 512. The model of the generative AI platform 512 can be used for converting the natural language in the public cloud service, such as OpenAI service 514 or the in-house LLMs 516.

In a third step, the API prompt portion may work with the vector database 506 to turn filter values from "generic" requests to vectors and find a closest matched ID. In a fourth step, the API prompt portion can build an API request for the client 502. In a fifth step, the client 502 may work with an API request portion of the UI 504 to create the API request.

The API request portion along with a top data portion and report portion of the UI 504 interact with the CA 508 and SM 510. Also, the CA 508 may provide a batch process with respect to the vector database 506, such as embedding strings that are client-specific to vectors. A build vector can be used to obtain an ID map. Thus, the UI 504 is configured to provide a visualization of the customized report to the client 502.

With respect to Natural Language Processing (NLP), a "chat" module may be used for converting natural language into text. In some embodiments, the process 500 may include using chat techniques to create insights into the status of the web, which may include user transactions on a network, data traffic, or other network conditions. The UI may then provide "insights" into the network or web.

As an example of a cost estimate, a fine-tuned Curie model may cost $0.24 per hour+$0.002 per one thousand tokens, where a token may be a basic unit that OpenAI GPT models (e.g., ChatGPT) may use to compute the length of a group of text characters. For example, the average prompt may be about 50 tokens and the average response may be about 250 tokens. In this example, 300 tokens=$0.0006/request. Given 6000 tenants×10 admins×20 requests/day, there would be 1,200,000 requests/day, which may have an estimated cost of $720/day.

Regarding privacy, the user (e.g., client 502) may provide the following request or prompt, "Show me the transactions from Rex Shang for the last 2 days." In the case of ChatGPT, the embodiments described herein may be configured to build a Personally Identifiable Information (PII) model to identify and filter the name "Rex Shang." With the in-house LLMs 516 or other suitable database, this would not typically be a concern.

Data Retrieval System

FIG. 8 is a block diagram illustrating an embodiment of a data retrieval system 520. In this embodiment, the data retrieval system 520 includes a secure database 522, such as LLM, private database, or other suitable data storage device for storing network transaction, organized factors with respect to the data, web insights, etc. According to the embodiments of the present disclosure, the secure database 522 may include information that is only accessible by user, employees, admin personnel, etc. within an enterprise. It some embodiments, the secure database 522 may benefit from various security services (e.g., those services provided by Zscaler, the assignee of the present application).

Also, the data retrieval system 520 includes a tracking and recording system 524, which may be configured to continuously track user transactions within a network, subnetwork, enterprise domain, autonomous system, etc. The tracking and recording system 524 may track transactions, network activities, data traffic, and/or other relevant information representing actions within the network under test. Then, the tracking and recording system 524 can store this data in the secure database 522. In some embodiments, the tracking and recording system 524 may be part of a network security software product.

Furthermore, the data retrieval system 520 may also include a pre-processing system 526. The pre-processing system 526, for example, may be configured to analyze the data stored in the secure database 522 and detect certain patterns in the data and learn (e.g., using Machine Learning (ML), Artificial Intelligence (AI), or the like) these patterns with regard to various factors. The pre-processing system 526 can organize the data based on certain factors (e.g., using classification strategies or supervised learning techniques). Also, the pre-processing system 526 can create summaries regarding various learned patterns and create or distill various insights which might be useful for enabling an admin to monitor the status of the network. The results, patterns, insights, etc. can also be stored in the secure database 522 with suitable links to a classification of possible queries about the network.

The data retrieval system 520 also includes a user query system 528, which allows a user (e.g., admin) to enter a search query and receive results of the query in graphical form (e.g., on a UI). The user query system 528 may be configured to use a UI to receive a user input, which may include entries provided in textual form in an input box and/or provided in audible form using a Generative Pre-trained Transformer (GPT), such as GPT-4, a chat program (e.g., ChatGPT), an NLP function, voice interactions, conversational UI, OpenAI, Stanford Core NLP library, etc.

Using an Application Programming Interface (API), the user query system 528 may be configured to convert any voice commands to text. Also, the API can interpret commands written in conversational form to an input query that can be understood by a processor. Next, a rule-based engine may be used to filter the request to obtain a search query.

Among other types of filters, the search query may firstly include a "timeframe" having a range of time during which user transactions or other network activity events were recorded in the secure database 522 by the tracking and recording system 524. For example, the user may request records obtained received that very day ("today"), records obtained the previous week ("last week"), records obtained during a certain range (e.g., "May 5$^{th}$ through May 23$^{rd}$"), etc.

Also, the search query may secondly include the type of data being requested, such as "client IP addresses," "the most frequently visited websites," etc. and/or activity by a particular person, activity by a particular department, traffic with respect to a specific website or group of websites, etc.

The search query may thirdly include certain specific restrictions, limitations, characteristics, etc. about the request, such as "the top 10 . . . ," " . . . in bytes," " . . . by department," etc. Fourthly, the search query may include a request for how the retrieved data is presented to the user. This may include, for example, a request to show the data "in a pie chart," "in a bar graph," "in a table," etc. The rule-based engine of the user query system 528 may be configured to filter the request according to other criteria as well.

In some embodiments, the rule-based engine may also be configured to correct grammatical issues to produce a request that can be understood by a computer. For example, the rule-based engine may be configured to remove um's, you-know's, etc. and automatically make changes based on known patterns in the secure database 522. For example, if the rule-based engine interprets audio as "invites," it may be able to correct to a request that makes more sense in its context, such as by changing "invites" to "in bytes." Once the request is taken apart to retrieve various filtered portions of the request and correct for grammatical issues, the rule-based engine can then perform a search on the secure database 522.

Then, the user query system 528 is configured to allow the results of the search (by the rule-based engine) to be provided back to the API. The API may receive the results as raw data and then convert the results to a format that can be displayed on the UI. The UI may then display the query results to the user according to the user's request. Thus, according to various embodiments, the present disclosure includes:

1) an NLP engine for querying logs stored in a secure database, which may include hardware (e.g., data retrieval system 520, user query system, etc.) configured to retrieve securely organized logs (e.g., using network security processes, such as those provided by a cloud security provider), convert the logs to a display format that a user can understand, and then present results to a user on a suitable UI; and 2) UI workflow for allowing a user (admin) to enter a search query using natural language and then see the results presented on a suitable display device.

The embodiments are related to using Natural Language Processing (NLP) to interact with securely managed logs (e.g., cloud security logs) from one or more secure databases (e.g., secure database 522). The embodiments of the present disclosure are configured in contrast to conventional systems. Although anyone can run a report, it should be noted that complex systems, such as an enterprise domain, usually include a complexity that would require the expertise of a skilled technician, network operator, admin, etc. However, conventional systems normally require the user to drill down through multiple levels of interfaces to get to the desired information. Therefore, by allowing natural language input requests and interpretation/filtering of requests in a logical process, the user can more easily make requests that can be interpreted by the systems and methods described herein. If the request brings up information that the user did not intend, the user can easily see where the interpretation may have veered from the user's request and rephrase the request and/or add additional request criteria. Also, with the pre-processing of data, the systems of the present disclosure can organize the data in an anticipatory manner by classifying possible requests based on the records or logs recorded.

One goal is to take the natural language requests and convert them to queries that can be processed. This would allow an operator to interact without the expertise in the log system. It may be noted that various embodiments may be associated with databases that are isolated from the general public in order to avoid hackers from retrieving data that may be sensitive. Therefore, the user query system 528 may be configured with various security software running in the cloud to allow a network operator or administrator associated with an enterprise to be able to search network status results for one or more databases that store logs, records, data, etc. of that enterprise. Thus, the search queries will be configured to stay within the realm of the enterprise and would not allow outside enquiries.

For example, an enterprise and/or a network security company (e.g., Zscaler) may store a large amount of valuable data. In some cases, the network security company may monitor a lot of users, all the time, for a lot of companies. From the data logs, it may be possible to develop various insights into user behavior, productivity, malicious activity, etc. Some queries, for example, may ask, "How many of my employees are on Facebook at least 30 minutes each day?". This type of information along with other similar searchable events or patterns may be recorded and analyzed behind the scenes without divulging sensitive information to general clients. When these various scenarios are detected, a query in line with the saved scenarios can be quickly retrieved. In addition, even if a query has not been anticipated, a search can be made for one enterprise and may be repeated for the network systems of other enterprises with their respective network activity data.

In operation, the cloud-based system 100 (described with respect to FIGS. 1, 2, 5, and 6), as well as other devices, services, etc. of the present disclosure, can maintain statistics and logs. As described herein, this can be referred to as log data, and can reside in the log or database, as well as being streamed continuously. That is, the term log data can be either stored data or in-transit data. The log data represents activity by a user device 300 in the cloud-based system 100. As described herein, the term user device 300 can be any processing device that connects to the Internet 104 and/or cloud services 106, via the cloud-based system 100. Also, the user device 300 can be associated with a user 102, e.g., laptop, desktop, tablet, smart phone, etc., as well as a server or an IoT device.

As described herein, the cloud-based system 100 can maintain the log data, with records used in a backend data store for queries. A record is a collection of tens of thousands of counters. A counter can be a tuple of an identifier (ID) and value. As described herein, a counter represents some monitored data associated with the cloud-based system 100. Of note, the log data is referred to as sparsely populated, namely a large number of counters that are sparsely populated (e.g., tens of thousands of counters or more, and possible orders of magnitude or more of which are empty). For example, a record can be stored every time period (e.g., an hour or any other time interval) in the cloud-based system 100. There can be millions of active users 102 or more.

In an embodiment, the identifier can be an IP address and a location identifier. The IP address can be IP version 4 (IPv4) or IP version 6 (IPv6) and is unique for each location. The location identifier can be a string (e.g., company X HQ, San Jose Wi-Fi, etc.). This combination (i.e., IP address and location identifier) can be a universally unique identifier (UUID). However, as described herein, the IP address can be assigned to a different device over time. The present disclosure addresses this issue, namely after a break in log entries and new log entries.

Examples of the log data can be the Nanolog system from Zscaler, Inc., the applicant. Also, such data is described in a) commonly-assigned U.S. Pat. No. 8,429,111, issued Apr. 23, 2013, and entitled "Encoding and compression of statistical data," the contents of which are incorporated herein by reference, describes compression techniques for storing such logs, b) commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and c) commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

Generative AI

It may be noted that the world is witnessing one of the most profound tipping points in the AI revolution. For example, generative AI may be considered the new norm for how humans will interact with data and computer systems in the future.

ChatGPT is an example of a competent AI model with both APIs and "conversation UI" workflow. In some respects, it may be poised to replace the conventional enterprise software workflow and dashboard paradigm. Currently, there is no way to leverage and integrate emerging technologies such as Generative Artificial Intelligence, NLP, voice interactions, etc. and integrate these technologies with large scale databases, particularly those databases include extremely large amounts of records and logs stored in response to detection of network activities in an enterprise domain, particularly related to network security products offered by a cloud security provider. Thus, the addition of these data retrieval systems and methods, the embodiments described herein are configured to:

1. help customers achieve the most robust and secure digital transformation infrastructure possible; and
2. help enterprises to be more operationally efficient.

Chat functionality (e.g., a chat tool) may be used as an internal tool built into other network security products to leverage generative AI and natural language models. According to the embodiments described herein, the chat tool capabilities can also provide more customized and vertical services based on various use cases. The chat tool for ZIA Web Insights, for example, is one such critical use case. It can serve as a "digital assistant" or a "digital intern" to accelerate analytics tasks that would otherwise take hours for a security admin. Even though it is not intended to replace the roles of a human, it can work around the clock tirelessly to collect data, parse large datasets that may be obtained using ZIA Web Logs, distill insights, make summaries, etc.

Today, a Web Log table may contain a large amount of data with over 100 columns. A "Web Insights" feature may be adapted to help admins visualize the traffic data in different types of charts/graphs. In some embodiments, there may be a total of 30 different filters available to manually filter the Web Insights data.

Thus, the systems and methods of the present disclosure may be configured to overcome several deficiencies or "pain points" in conventional systems. For example, conventional systems normally require tedious manual efforts on the part of the admin to apply filters one-by-one. The admins would normally be required to understand the search product, which, even still, may require the admin to perform too many clicks to get the answers the admin is looking for. Also, with various hierarchical structures of various search products currently in existence, it may be necessary for a user to drill down many layers to get to the information they need. Furthermore, the drill-down processes are not always intuitive in these conventional systems. However, the embodiments of the present disclosure are configured to overcome many of these deficiencies to provide a simple, intuitive platform.

According to some embodiments, the systems described herein may be configured to handle one query at a time. To speed up the query processing function, the request may normally be limited to a certain number of words. Otherwise, it may be difficult to distinguish the key words. Then, after quickly responding to one request, a second query can be entered if clarification is needed. For example, a user may inadvertently ask for a timeframe that he or she might not necessarily be interested in at that time. Therefore, if the results show a different timeframe, the user can rephrase the request and get the results they want.

The systems and methods may utilize the Stanford Core NLP library or other similar technology to optimize the performance, such as by reducing time for keywords to chart processing. Also, the systems and methods may include one or more of the following features:

1) Query Suggestions: Based on pre-processing or requests by other users, the system may add preset and/or commonly-used queries for quick analysis; and
2) Saved Queries: The system can save previously searched queries and present these to the users so that they can quickly perform the same query at a later time.

For example, the systems and methods of the present disclosure may apply the following filters for each query:

1) Show the applicable filters that are associated with each query;
2) Voice UI: an alternative to keyboard input;
3) Mic, Record, Stop buttons for voice inputs;
4) Show error states for incorrect queries; etc.

The present disclosure takes generative AI to the next level by allowing enterprises or organizations to ask questions about their own data in the form of queries without any sensitive information leaving their environment. The chat tool has a potential to dramatically accelerate business workflows. For example, CISOs and CIOs can get some urgent questions answered on a weekend afternoon without bugging their teams.

The chat tool may be developed to play an increasing role in the environment of network security to deliver a secure digital transformation infrastructure for customers with reliability, availability, and serviceability. The ChatGPT APIs, GPT-4, and various generic and personalized generative AI services may be able to significantly accelerate the missions of network security providers (e.g., Zscaler) in the future.

Query System

Figure 9:
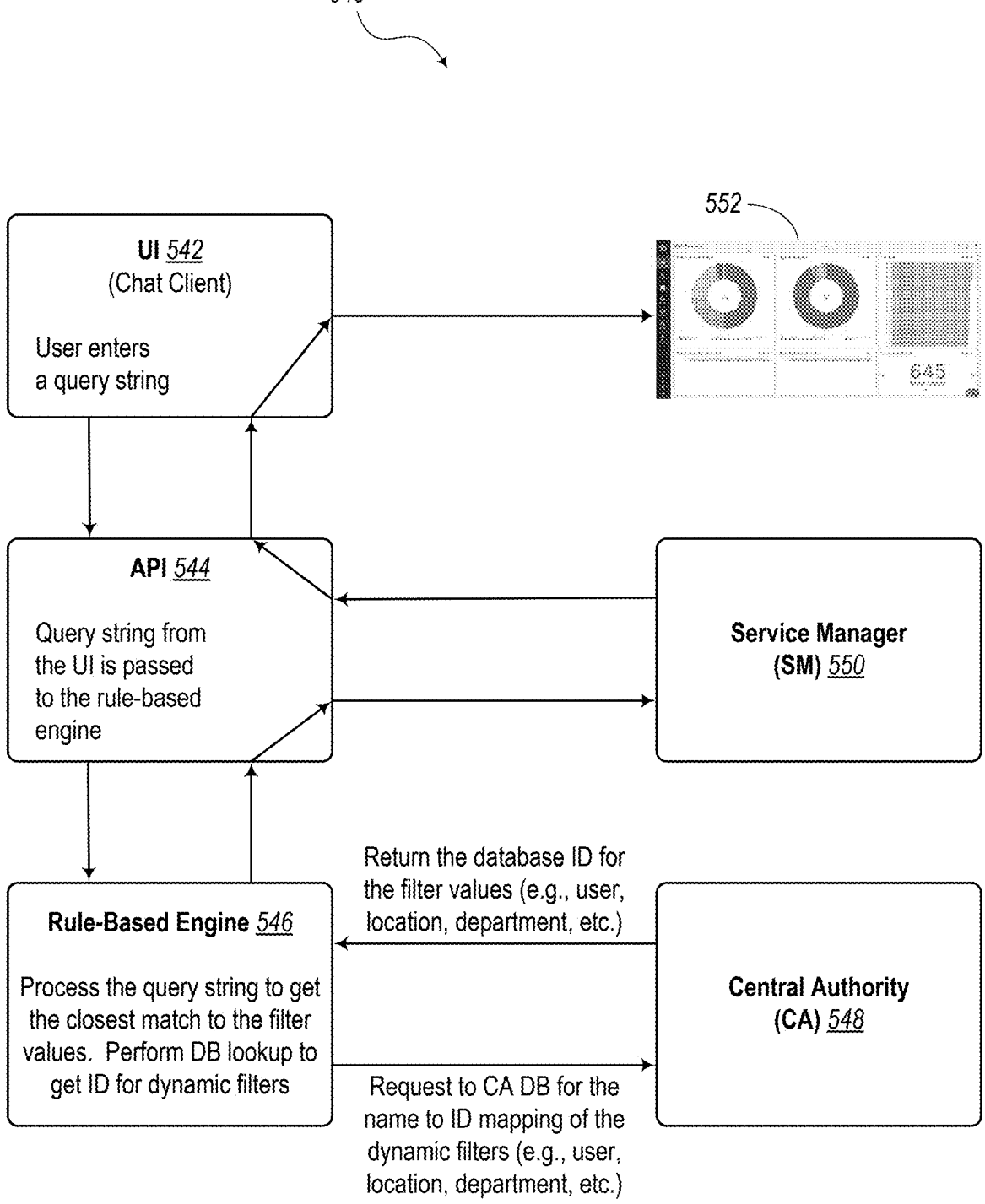
FIG. 9 is a block diagram illustrating an embodiment of a query system.
Figure 10A:
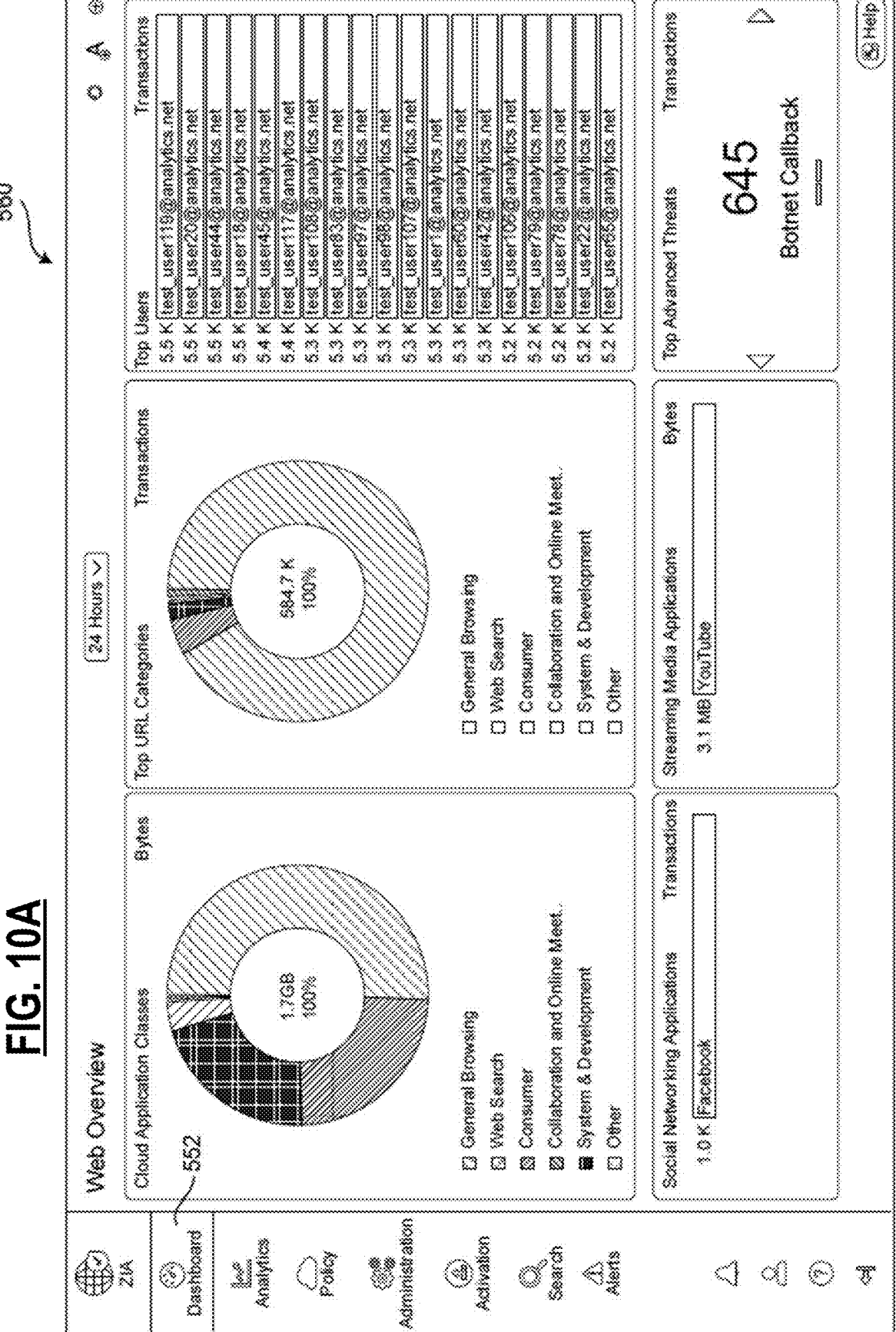
FIGS. 10A and 10B show example screenshots of a home page dashboard that is presented on a UI.
Figure 10B:
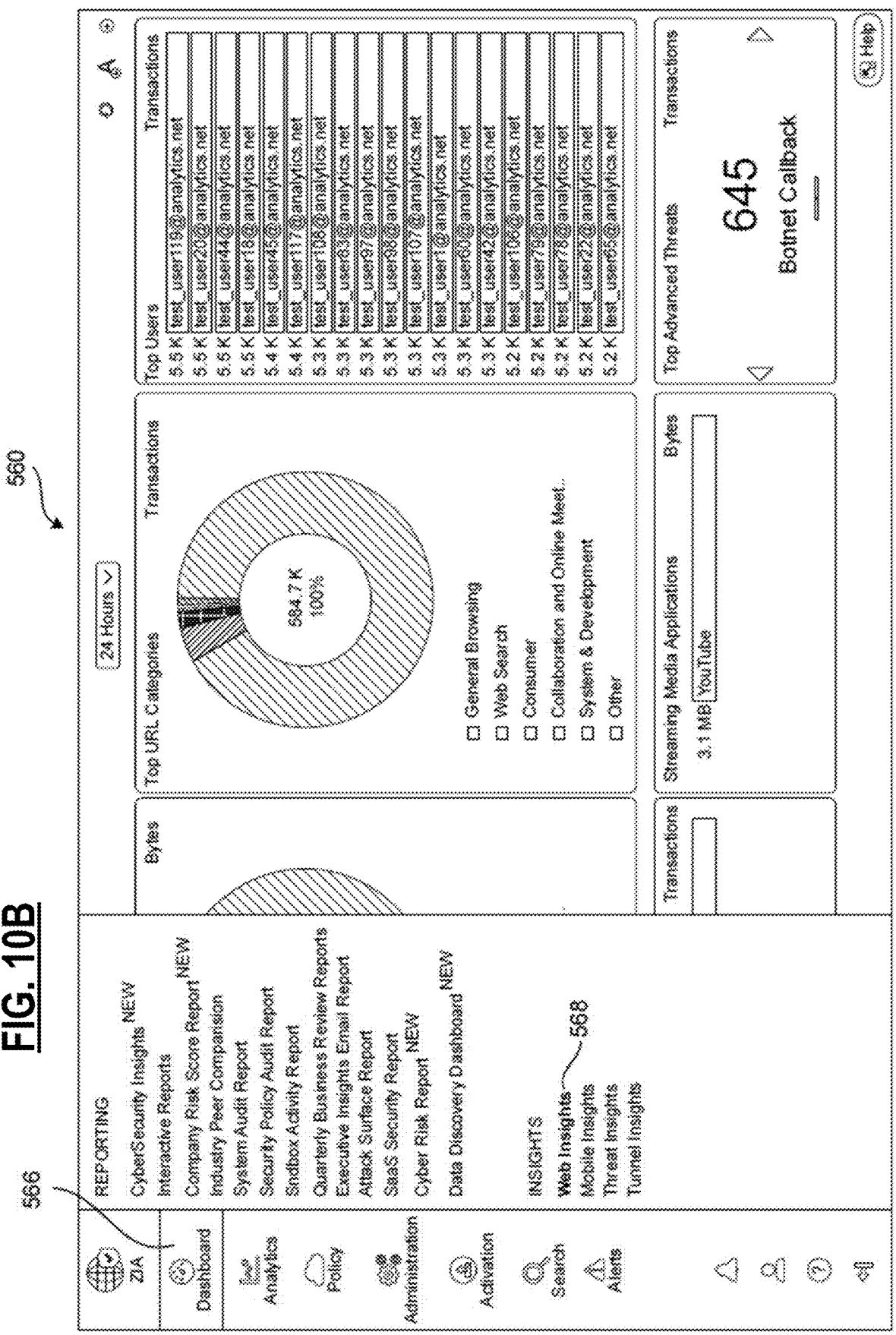

FIG. 9 is a block diagram illustrating an embodiment of a query system 540. As shown, the query system 540 includes a UI 542, an API 544, a rule-based engine 546, a Central Authority (CA) 548, and a Service Manager (SM) 550. The UI 542 (chat client) allows a user to enter a query string. The query string is submitted to the API 544, which is configured to relay it to the rule-based engine 546. The rule-based engine 546 is configured to process the query string to get the closest match to certain filter values. Next, the rule-based engine 546 is configured to perform a database lookup to get an ID for dynamic filters.

The rule-based engine 546 then requests the CA 548 to search its database for the name to the ID mapping of the dynamic filters, which may include a specific user, a specific location, a specific department, etc. The CA 548 then returns the database ID for the filter value to the rule-based engine 546. This information is passed back to the API 544, which may be configured to utilize the SM 550. The API 544 then sends the response to the UI 542, which is configured to present the information in a suitable form, such as a screen display 552 that can be displayed on the UI 542 for the user's viewing.

Today, a cloud security provider processes 300 billion user transactions a day. For an admin or network operator, the process of looking up and filtering through specific logs to get insights about what is happening in the network can be cumbersome and time-consuming. Until now, there has been no way to leverage and integrate emerging technologies (e.g., generative AI, NLP, etc.) with various network security products. However, the systems and methods of the present disclosure are configured to provide solutions in this regard to overcome the deficiencies in the conventional systems. Thus, the present disclosure can simplify queries, reduce complexity, eliminate the need for an expert in the operation of various query software products, simplify the process of getting meaningful information from logs by entering simple sentences, help customers (users, admin) to achieve a robust and secure digital transformation infrastructure, help enterprises to operate more efficiently, etc.

Stanford Core NLP enables users to derive linguistic annotations for text, including token boundaries, numeric and time values, parts of speech, named entities, and the like. It helps optimize and process internal objects to improve the query performance and provide faster response for keywords to web insights data processing. Also, the Stanford Core NLP pipeline takes in the query string input from the user and processes it by running a series of NLP embedded models which are trained based on the custom rules provided by the cloud security provider. Core NLP can be an additional module of the existing cloud security provider architecture. This helps network security systems to process the customer query string in the cloud-based system 100. No sensitive information is sent out to any of the public servers. Regarding Web Speech API, a Speech Recognition interface of the Web Speech API may be used to allow a user to enter the query string using their voice instead of typing it.

As an example, an admin of an enterprise can log into Zscaler Internet Access (ZIA) and navigate to Web Insights to take a peek at the company's traffic and trends. The admin needs to understand the product and apply multiple filters to narrow down to the trend or transaction logs that he wants to look at. This experience is made simpler using the new chat tool client.

The chat tool client has the following features and functionalities:

1) Users can search for trends and transactions by entering a query in simple text;
2) Suggested Queries—the system adds a preset list of all the commonly used queries for quick analysis;
3) Previously Searched Queries—the system saves all the previously searched queries. It makes it easier for the user to customize and re-run the queries;
4) Filters Applied—the system provides a view to show the list of filters that were applied for a particular query. This makes it easier for the user to validate the request based on the entered query; and
5) Voice UI—In addition to keyboard input, the user can use his voice to enter the query string. This makes it easier for the user to enter long queries without typing.

UI Workflows

Figure 11:
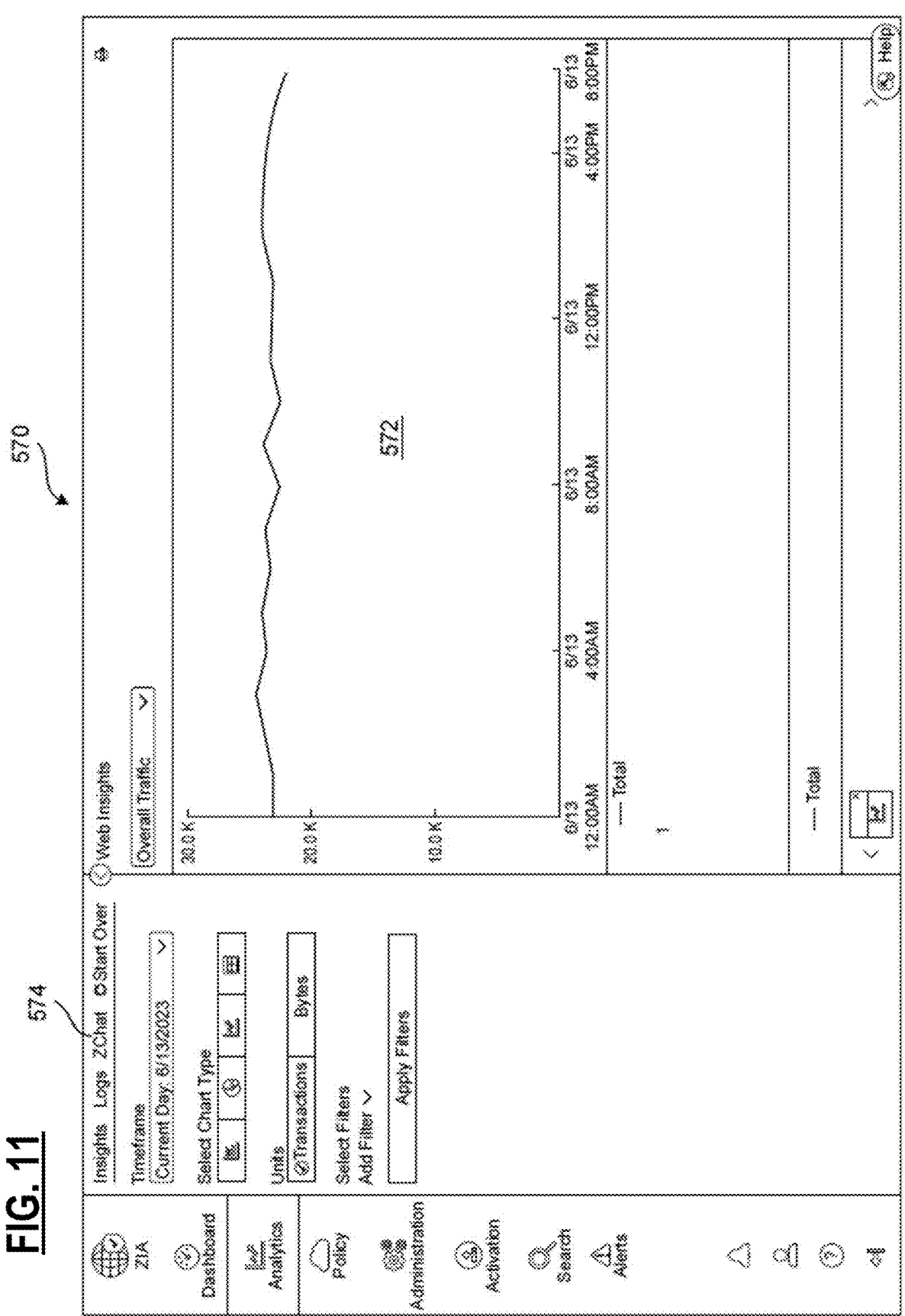
FIG. 11 shows an example screenshot of a Web Insights page when an Insights tab is selected.

FIGS. 10-16 show several examples of UI workflows for performing queries on a private database. FIGS. 10a and 10b show example screenshots of a dashboard 560 (e.g., homepage, home screen, etc.) that is presented on a UI or GUI of a computer display screen associated with a network operator, administrator (admin), technician, or other person responsible for monitoring network conditions for an enterprise. As shown in FIG. 10*a*, the dashboard 560 includes a view of a Web Overview showing different aspects of a network or domain of the enterprise. For example, the Web Overview of the dashboard 560 may have multiple windows, where different aspects of various details of the network are described in each window. When the user clicks on or hovers over the Dashboard button 562, the query system is configured to display a menu box 564 as shown in FIG. 10*b*. In the menu box 564, a Web Insights option 568 is available, allowing the user to receive insights with respect to the web or network associated with the enterprise. When the user clicks on the Web Insights option 568, the UI of FIG. 11 is displayed.

The UI workflows of the present disclosure may include systems, methods, and non-transitory computer-readable medium configured to store computer logic for enabling execution of various UI display functionality. According to one implementation, a UI-based method may include displaying a UI having a search request section and a dashboard section. For example, the search request section may be configured to allow an admin associated with an enterprise to enter a search query using natural language. The dashboard section, for example, may be configured to display results of the search query. Upon receiving a search query from the admin via the search request section, the method may include retrieving log data from a private database associated with the enterprise according to search parameters parsed from the search query. Furthermore, the method includes the step of displaying the log data in the dashboard section of the UI according to a display format parsed from the search query.

Additionally, the method may include displaying an Insights tab, a Logs tab, and a Chat tab in the search request section (e.g., lefthand section) of the UI. The Insights tab allows the admin to select a general view of web insights in the dashboard section. The Logs tab allows the admin to select a general view of data logs in the dashboard section. The Chat tab allows the admin to open a query input element in the search request section of the UI, the query input element allowing the admin to enter the search query using natural language.

When the Chat tab is selected, the method includes displaying a microphone icon in the query input element to allow the admin to switch between a text entry mode and a voice entry mode. When the query input element is in the voice entry mode, the method may include converting voice input into text using a Natural Language Processing (NLP) technique.

When the Logs tab is selected (FIG. 13*b*), the method includes displaying at least a timeframe selection field, a URL search selection field, an activity-type selection field, and a display format selection field in the search request section of the UI. For instance, the timeframe selection field allows the admin to select a timeframe during which network activities occurred. The URL search selection field allows the admin to select certain types of URL addresses. The activity-type selection field allows the admin to select the type of network activity to be displayed in the dashboard section. Also, the display format selection field allows the admin to select one of a table, a line graph, a pie chart, a list, a bar graph, etc., defining the manner in which results of retrieving the log data are displayed.

According to some embodiments, the log data obtained in the UI-based method may include user transactions, network security issues, and/or data traffic parameters. Also, the method may include displaying one or more previously searched queries and one or more suggested queries in the search request section of the UI for selection by the authorized user. The method may also include displaying a Filters Applied list (FIG. 16*e*) in the search request section of the UI. The Filters Applied list may include a Graph Type filter, a Client IP filter, a Time filter, and a Unit filter to help the admin validate an interpretation of the search query. Furthermore, the UI may operate with an Application Programming Interface (API) and a rule-based engine to process the natural language for interpreting the search query and to filter the search query according to searchable characteristics of the private database.

FIG. 11 is a screen 570 showing Web Insights regarding the enterprise network. Alternatively, the screen 570 may be displayed when the Analytics button 566 is selected from the column of buttons on the left side of the page. As illustrated, the Web Insights page includes a graph 572 showing the network traffic on the network on the current day. Near the top left corner of the screen 570, the Web Insights page includes three tabs—an Insights tab, a Logs tab, and a Chat tab 574 (e.g., chat tool tab). From this page, the user can select one of these three tabs, select a timeframe, select a chart type (e.g., list, pie chart, graph, table, etc.), select units of measure (e.g., transactions, bytes, etc.), and select, add, or apply filters. As shown in FIG. 11, when the Chat tab 574 is selected, the query system is configured to present a new page as shown in FIG. 12A.

Figure 12A:
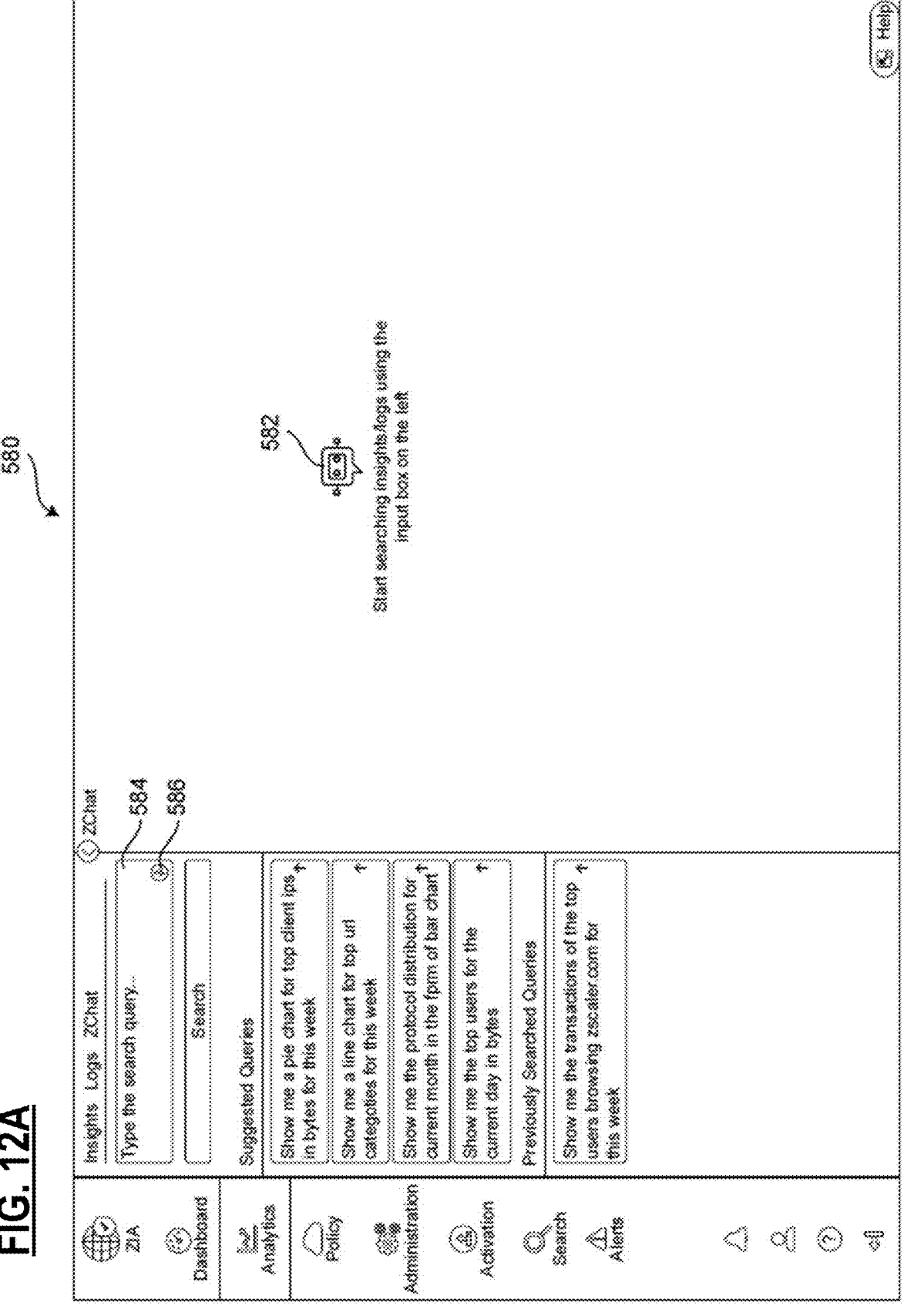

FIG. 12A shows a chat tool page 580 when the Chat tab 574 is first selected. The chat tool page 580 includes general instructions for allowing the user to search for insights or logs associated with the private database. In particular, the chat tool page 580 includes a search query box 584 (or query input element), which allows a user to type in a search query request. Also, the search query box 584 includes a microphone icon 586 allowing the user to enter a query using voice commands.

Figure 12C:
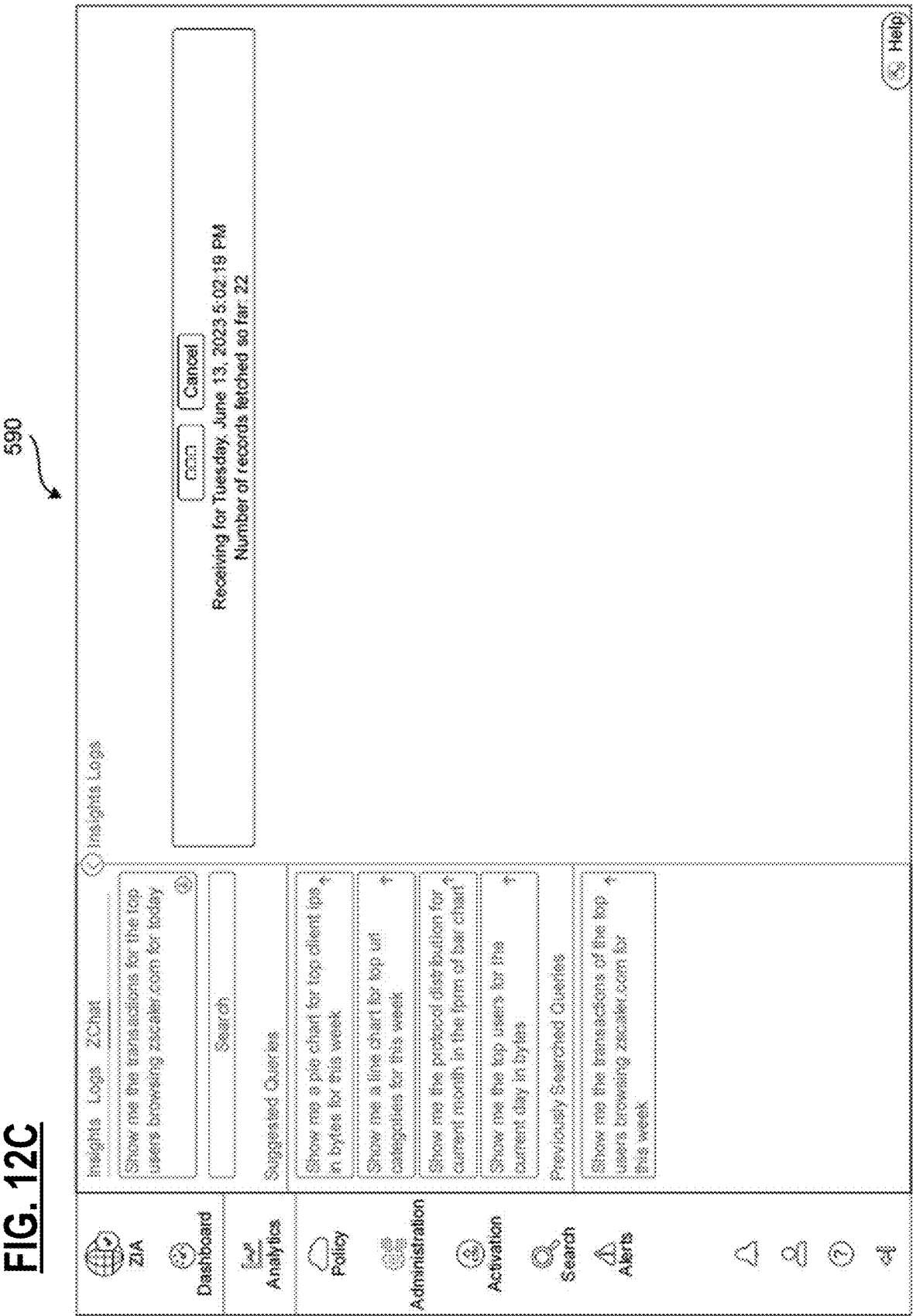

FIG. 12B shows a query entered into the search query box 584. As described above, the search query may be written in natural human language. In this example, the user has entered the query "show me the transactions for the top users browsing zscaler.com for today." Upon clicking on the Search button 588, the query system performs the analysis of the query to retrieve various aspects (e.g., timeframe, display type, units, etc.) from the query. During analysis, the query system may display the screen 590 as shown in FIG. 12C to indicate that the records are being retrieved according to the user's query.

FIG. 12D shows the results of the query, displayed as Insight Logs 592 since no other graphical display request (e.g., table, chart, graph, etc.) was included in the request. It may be noted that the results or Insight Logs 592 are displayed on one side of the page while the search query box 584 is still displayed on the left side. Thus, while the results are still being displayed, the user can enter a new query in the search query box 584. As illustrated in FIG. 12E, the user enters a new query "show me the pie chart of the top client IPs for this week in bytes" and presses the Search button 588.

Figure 12F:
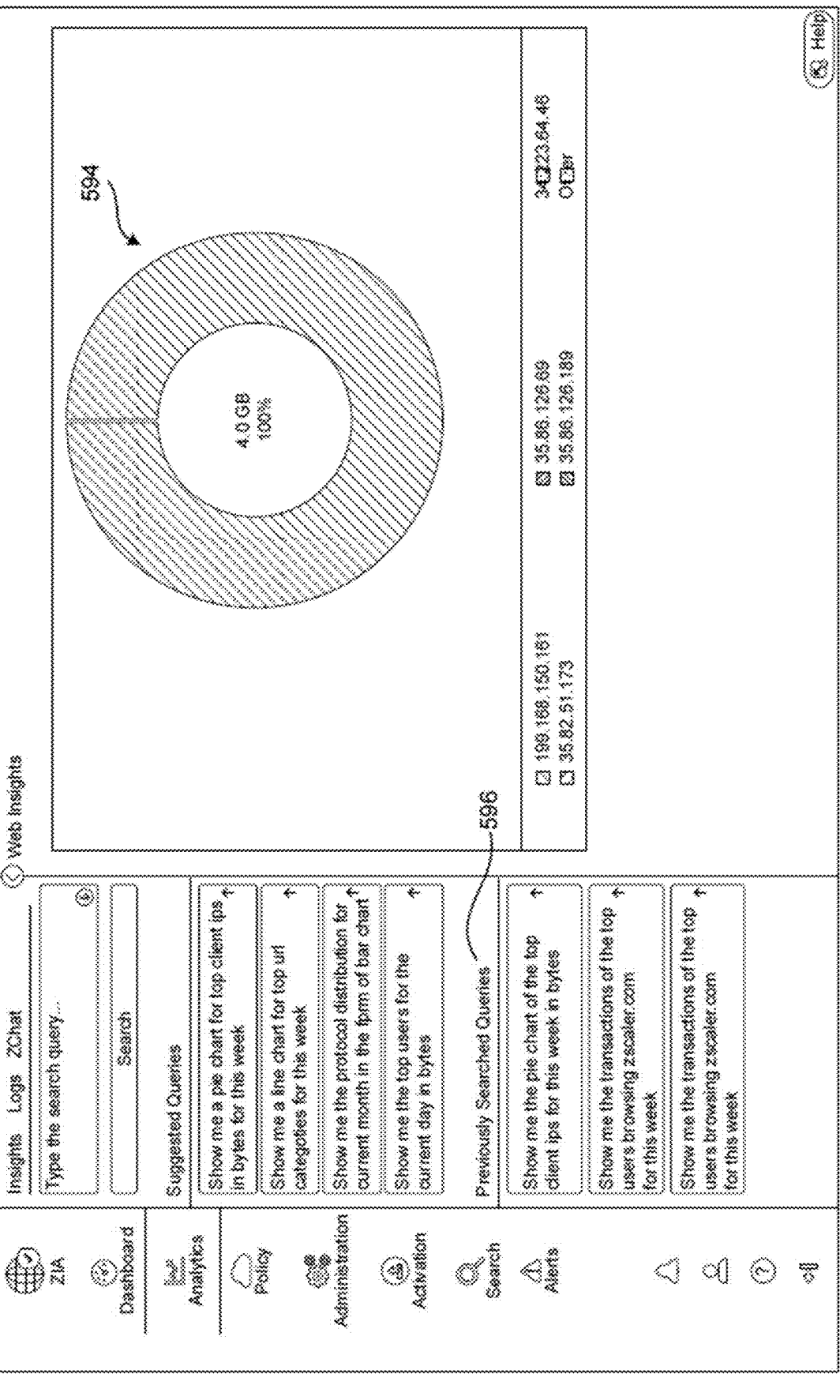

FIG. 12F shows the results of the new search, which includes a Web Insights display 594. That is, the query system is configured to parse the request into timeframe ("this week"), display type ("pie chart"), subject ("top client IPs"), units ("bytes"), etc. Using these element of the search request, the query system retrieves the relevant data from the private database and displays the information according to the request. It may be noted that the previous search requests are displayed in a Previously Searched Queries section 596, which may start with the latest query. That is, the current query "show me the pie chart of the top client IPs for this week in bytes" is shown first, followed by the next most recent request "show me the transactions for the top user browsing zscaler.com for today" (FIG. 12B), and so on.

Figure 12G:
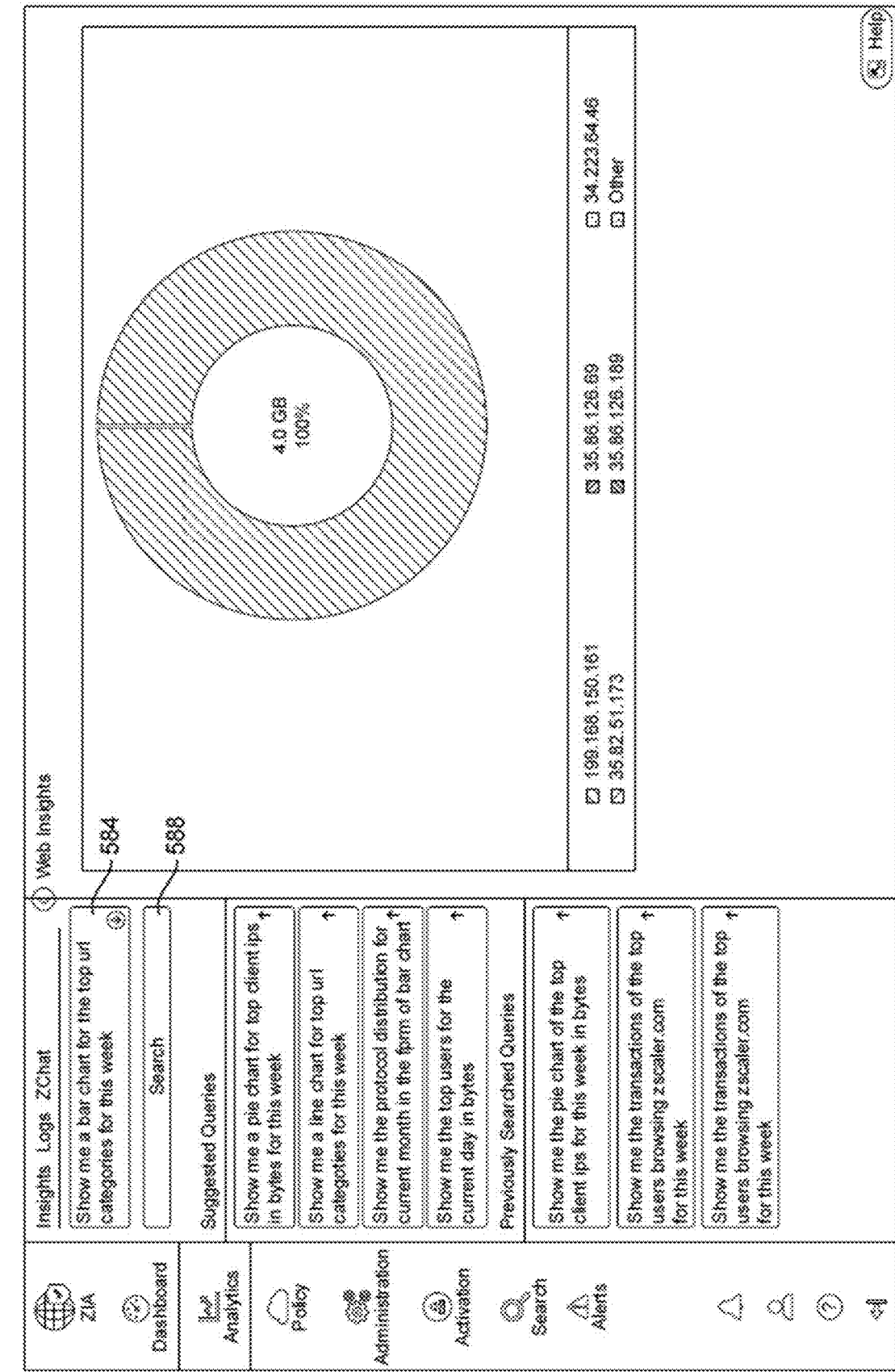

Furthermore, the user may continue to search the private database using a new search query, entered into the search query box 584 as shown in FIG. 12G. In this case, the user enters a request to "show me a bar chart for the top URL categories for this week." When the user enters this request and clicks on the Search button 588, the query system again parses the request, searches the database, and displays the results in a new Web Insights page 600 as shown in FIG. 12H.

Figure 12I:

Suppose, for example, that the user wishes to enter a new request, but this time, he or she wishes to enter the request using voice input. In this case, the user can use a mouse pointer to select the microphone icon 586, as shown in FIG. 12I, and begin speaking.

Figure 12L:
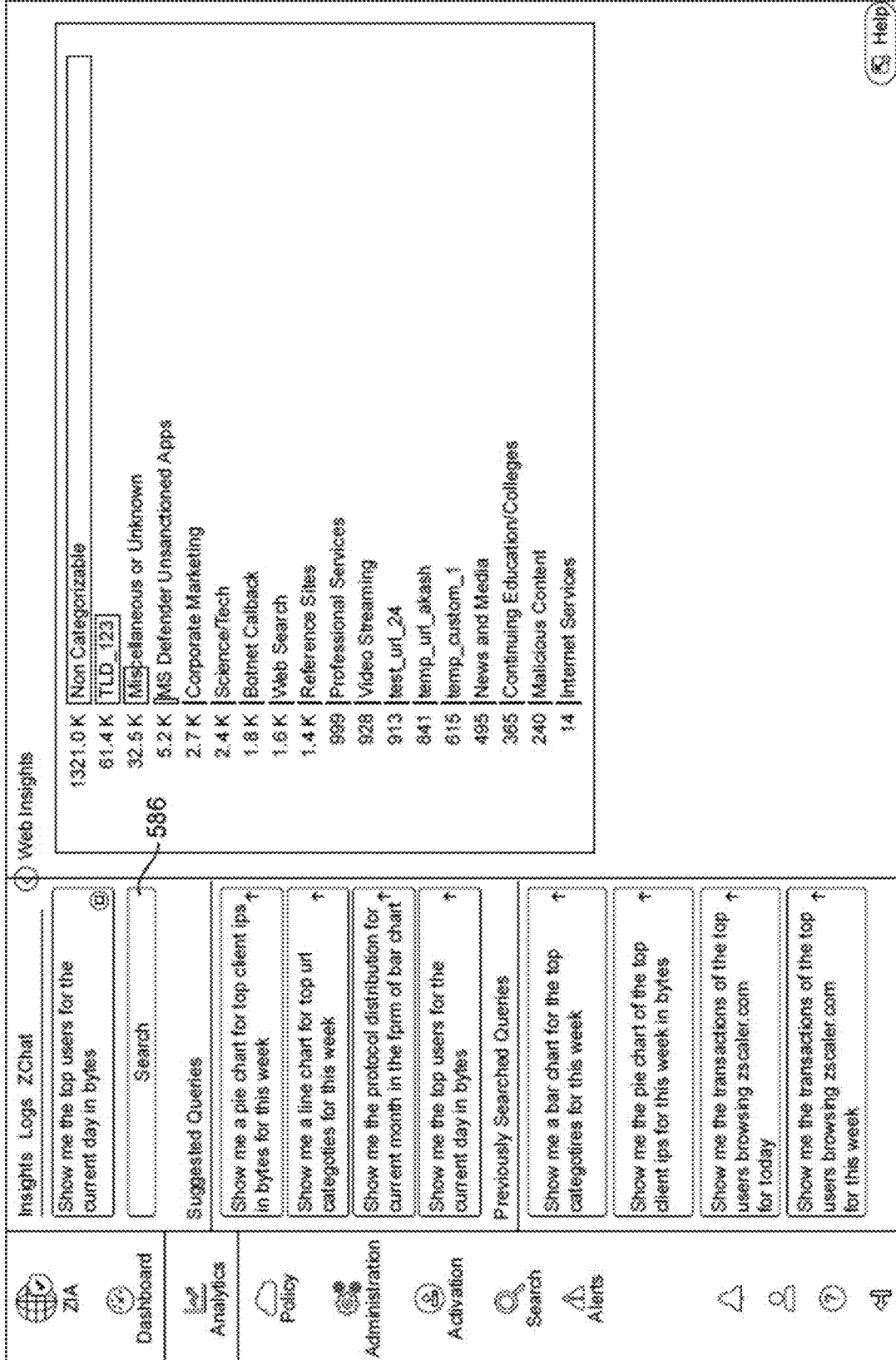

As shown in FIG. 12J, the voice entry is interpreted by the query system and displayed in the search query box 584. Suppose, however, that the user intends to request the query system to "show me the top users for the current day in bytes," but the voice analysis system interprets "in bytes" as "invites," as shown in FIG. 12J. The user can click on the Stop button 602 to stop recording his or her voice, as shown in FIG. 12K, and can manually type in a correction, as shown in FIG. 12L, specifically to change "invites" to the intended "in bytes" in this case. Again, the user can then click on the Search button 588. FIG. 12M then shows the results in the correct format, where the current day data is shown for the top users "in bytes."

Figure 13A:
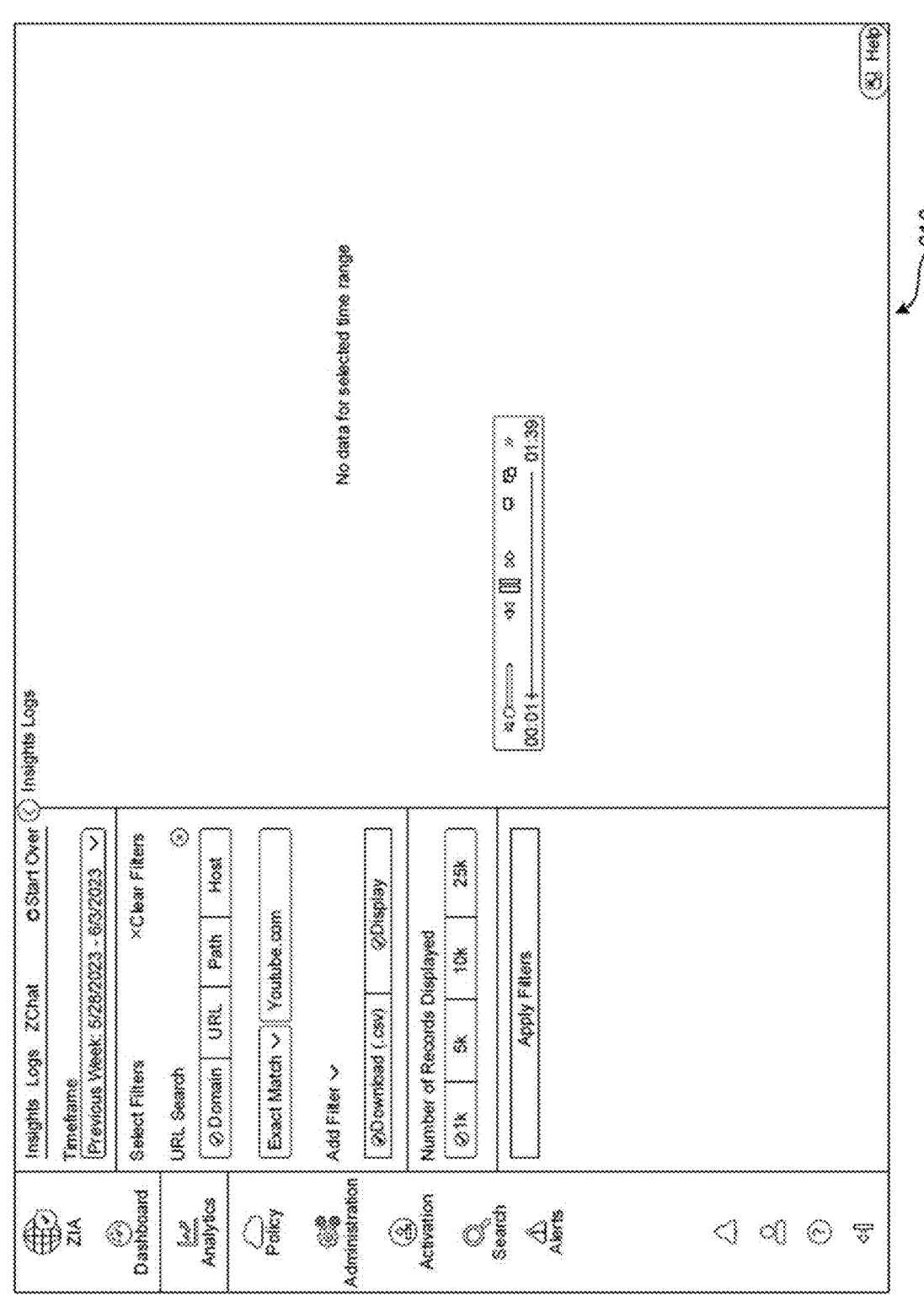

FIG. 13A shows an Insights Logs page 610 when a Logs tab 612 is selected. In the Logs mode, the left side of the UI shows options where a user can enter information to retrieve specific data logs (stored in the private database). In particular, the user can select a timeframe (e.g., "previous week: May 28, 2023-Jun. 3, 2023"), filters, specific URL searching (e.g., domain, URL, path, host, etc.), limitations (e.g., "exact match"), the URL (e.g., "youtube.com"), filters to be added (e.g., download (.csv), display, etc.), and number of records displayed (e.g., 1k, 5k, 10k, 25k, etc.).

Figure 13B:
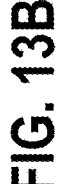
Figure 13E:
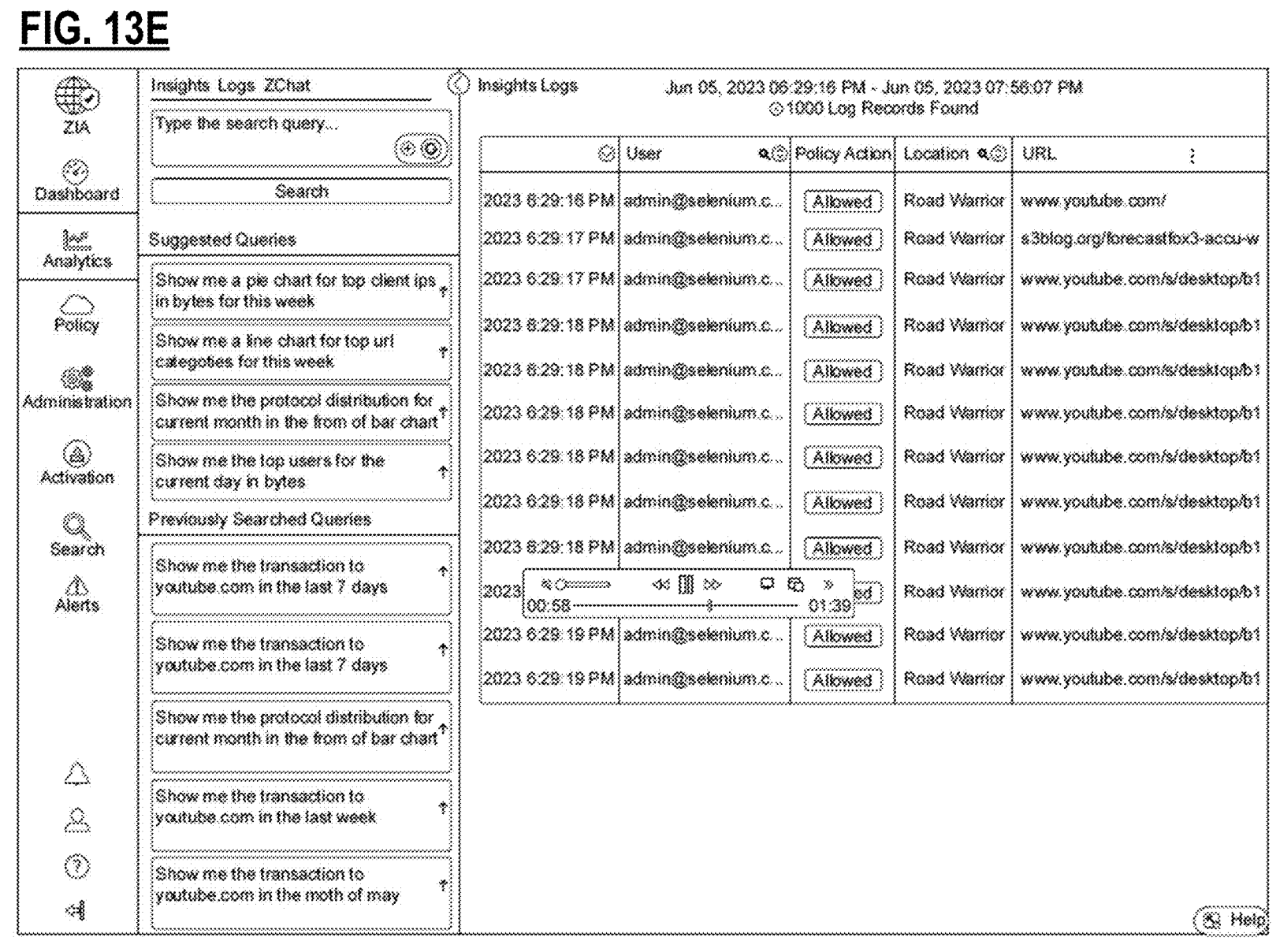

As shown in FIG. 13B, the user may click on the Chat tab 574 ("chat tool"), which brings up the search query box 584 as shown in FIG. 13C. For example, based on the entries made with respect to FIG. 13A, the search request may be automatically entered (i.e., "show me the transactions to youtube.com in the last 7 days") or the user can enter or edit the request by manually typing. When the user clicks on the Search button 588, the query system begins processing the new query. Again, as shown in FIG. 13D, the query system may display an indication that the system is working to retrieve the requested data for the current request and may indicate the number records already fetched (e.g., 3408). When the retrieving or fetching process is complete, the query system displays the results, as shown in FIG. 13E.

Figure 14:
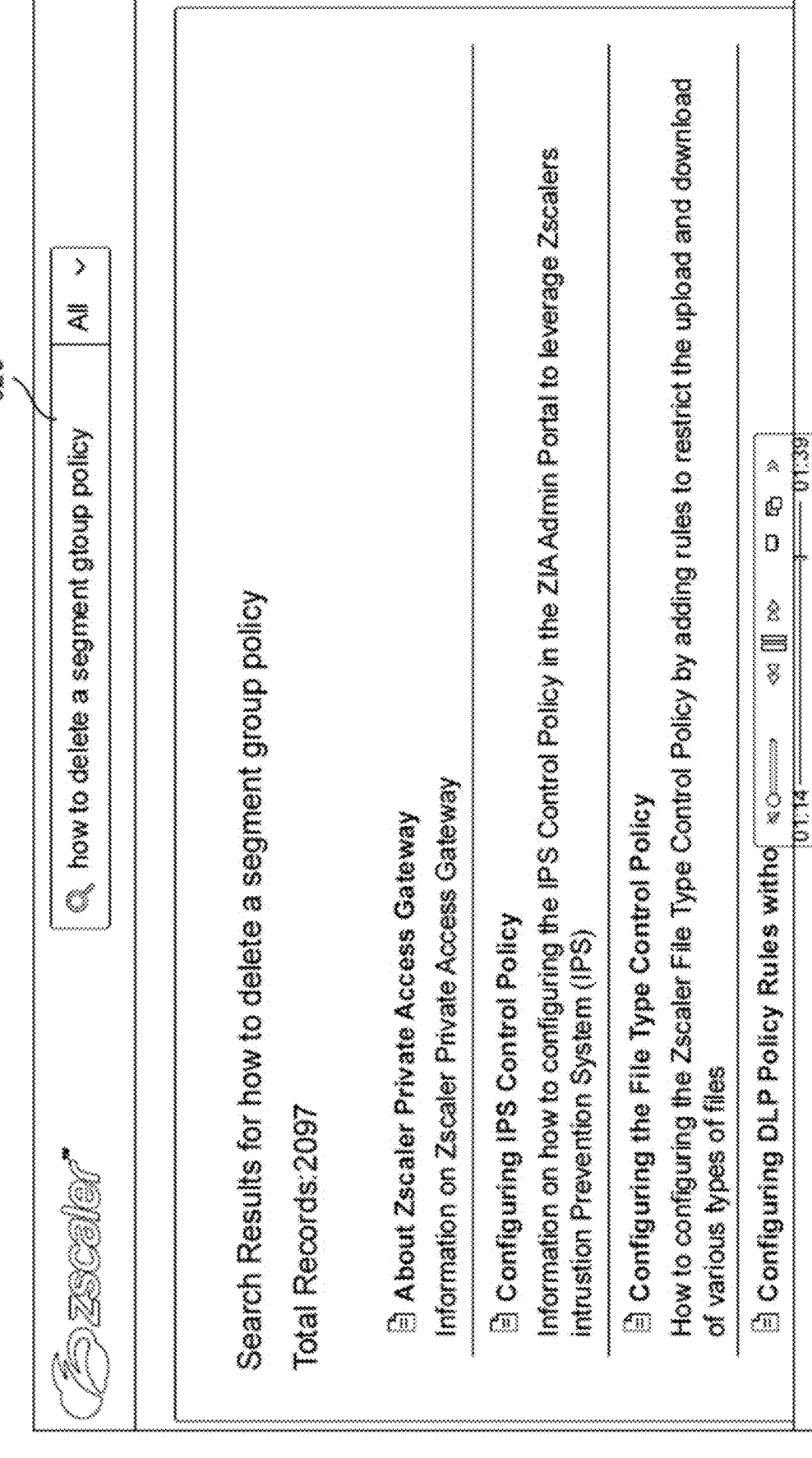
FIG. 14 is a screenshot showing a previous solution for obtaining information about a query.

FIG. 14 shows an alternative method of entering a request, which may be similar to conventional methods. In this case, a request (e.g., "how to delete a segment group policy") is entered in a window 620. Based on the best interpretation of the request, the system might provide a list of possible answers in a list with links to each one. In this case, there are 2097 total records found that might match the request. However, since it can be difficult and time-consuming to find the request that is actually intended by the user, the present disclosure may use generative AI or other suitable machine learning techniques to better narrow down the request to a more accurate interpretation without overwhelming the user with dozens or even hundreds of results. By showing the results for one interpretation, the user can then tweak the request as needed to get closer to the desired results. Otherwise, the user may waste time being directed down dead-ends without coming closer to the intended search results.

Figure 15A:
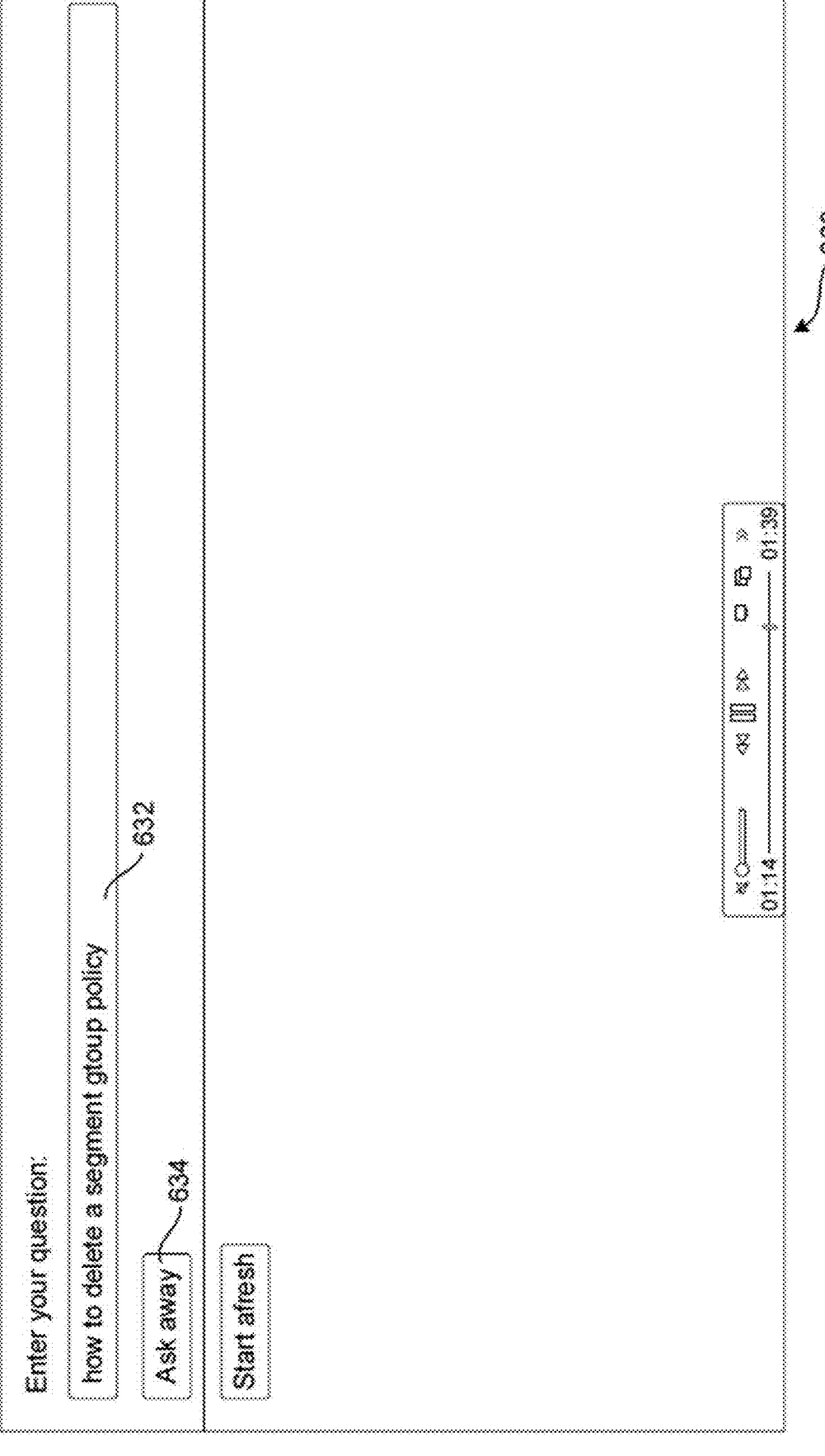

FIG. 15A shows another screenshot 630 of a search entry page, which may be found by the user using various means. For instance, using the same example as used with respect to FIG. 14, the user may wish to find out "how to delete a segment group policy" by entering (e.g., text, voice, or combination) into a search box 632. In this case, however, the generative AI or ML processes of the present disclosure may provide more accurate results. When the user pressed the Ask Away button 634, the query system searches the database and provides the results 636 as shown in FIG. 15B. Thus, the present disclosure improves productivity for customer support. Searching a help page may require reading through pages to get the correct answer. But now with generative AI, these answers can be obtained directly, as shown in FIGS. 15A and 15B. Behind the scenes, the system uses a customized LLM that is configured to access data across multiple different databases, such as community databases, help resources, etc.

Figure 16A:
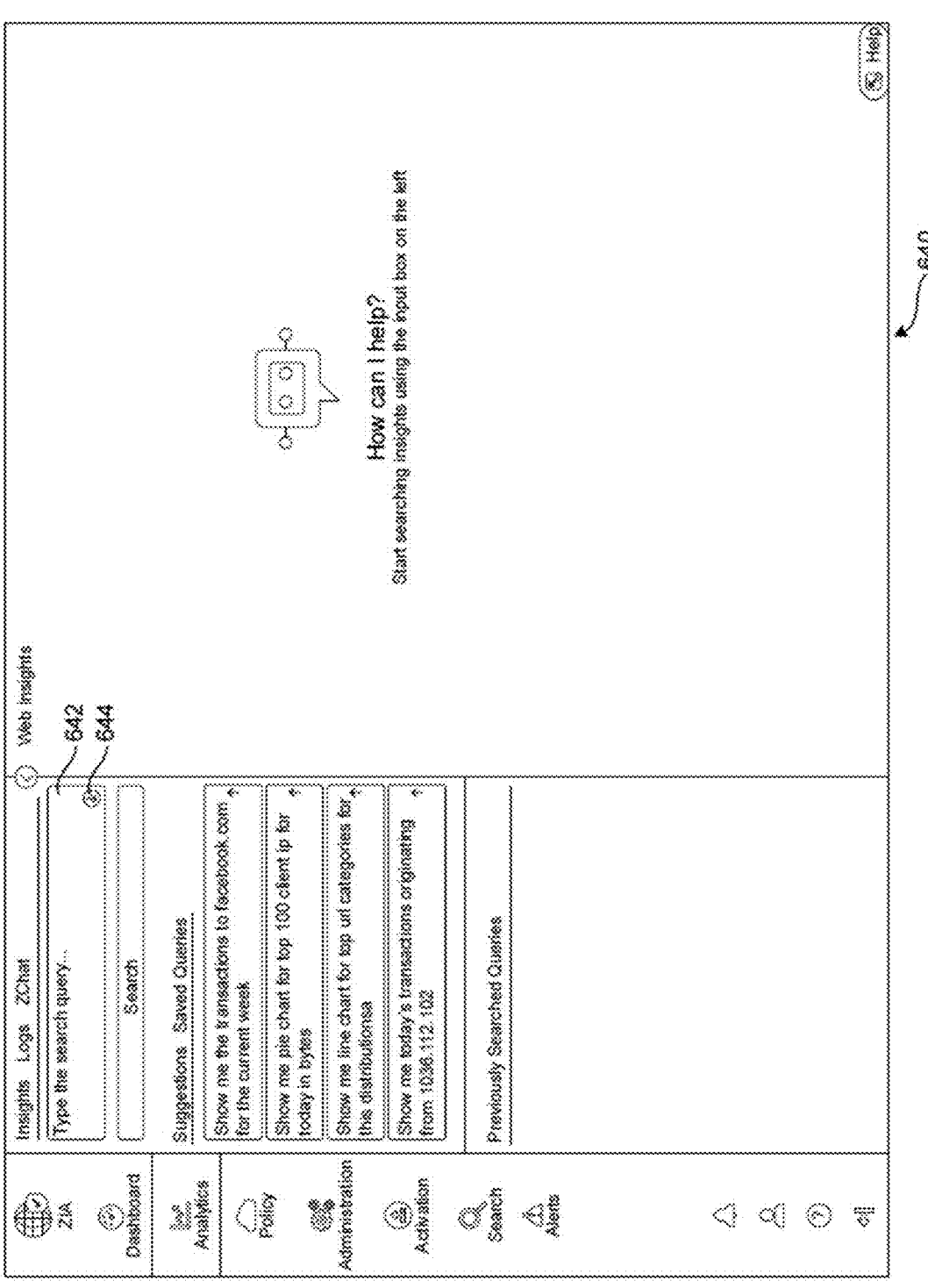
Figure 16C:
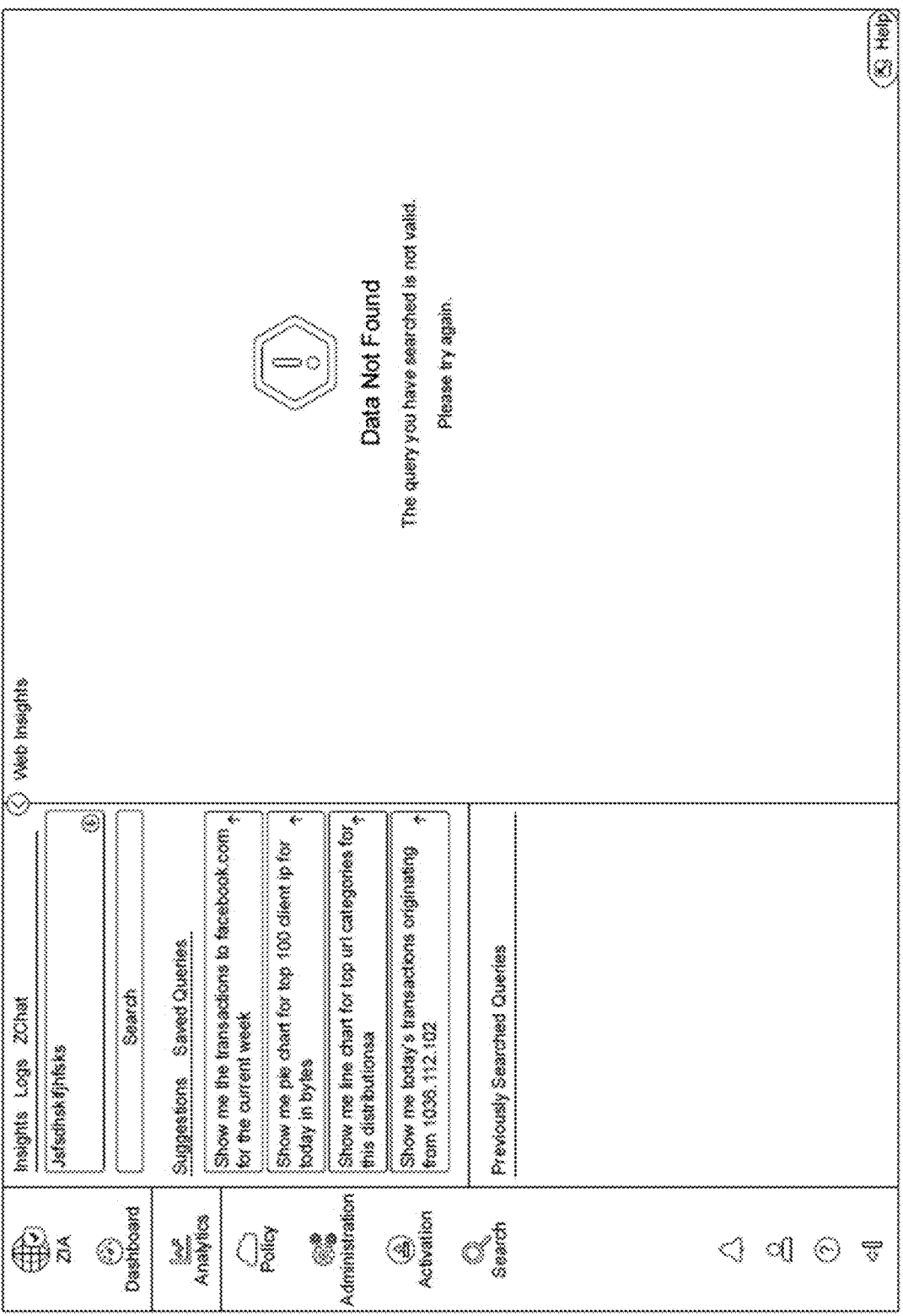

FIG. 16A shows the start of another UI experience. In the chat tool section showing Web Insights, before a new request is entered, the screen 640 may include graphics and instructions for entering a search. Textual requests can be entered in the box 642 by typing and/or can be entered by clicking on the microphone icon 644 and speaking the request. Users can enter the query string in the box 642 (text input field) either by typing or using the voice assistant. In FIG. 16B, a request is entered in the box 642 that may be unrecognizable by the query engine. In this case, the system may provide an error screen as shown in FIG. 16C, which indicates that data has not been found and a new search should be entered.

Figure 16D:
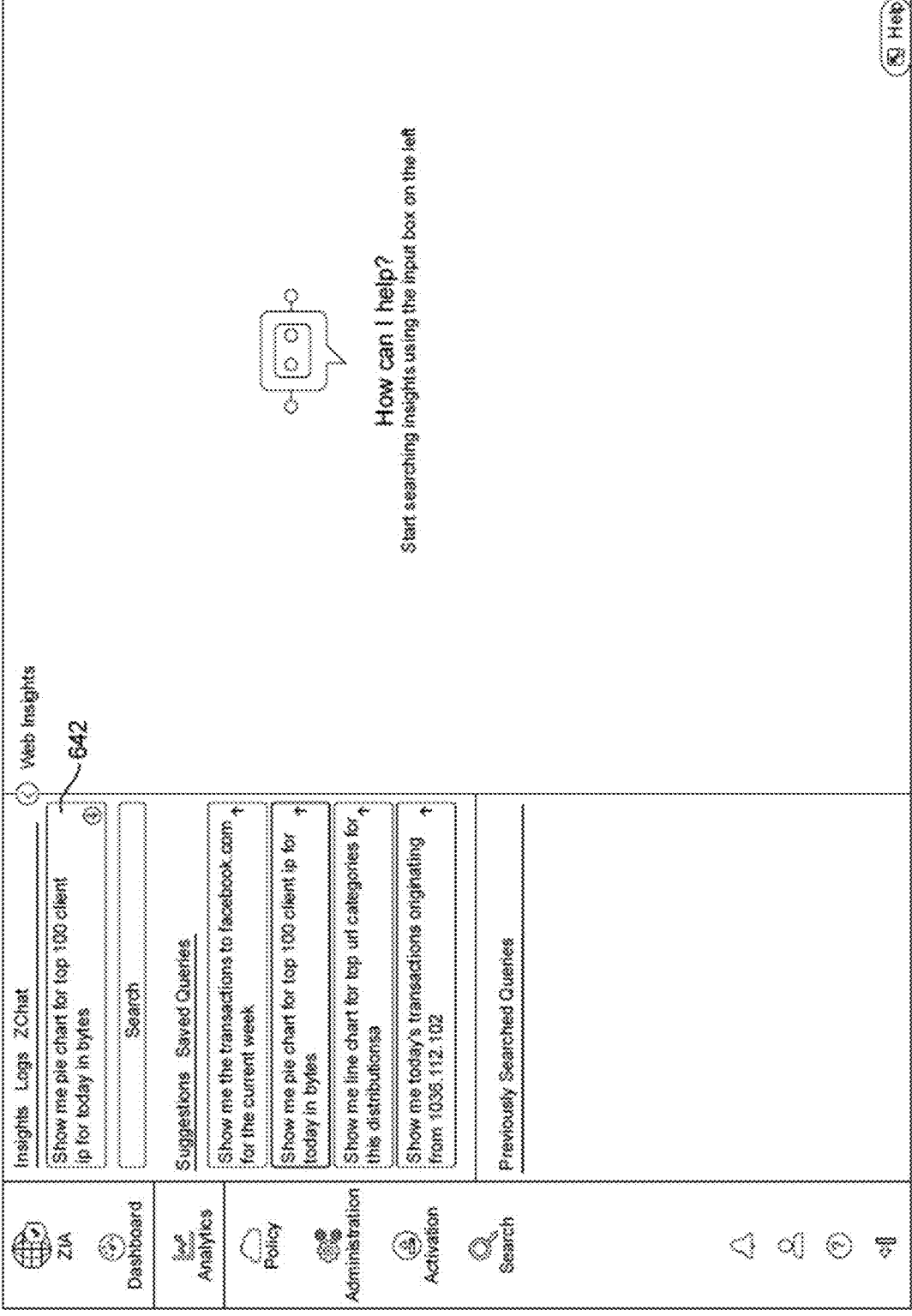
Figure 16E:
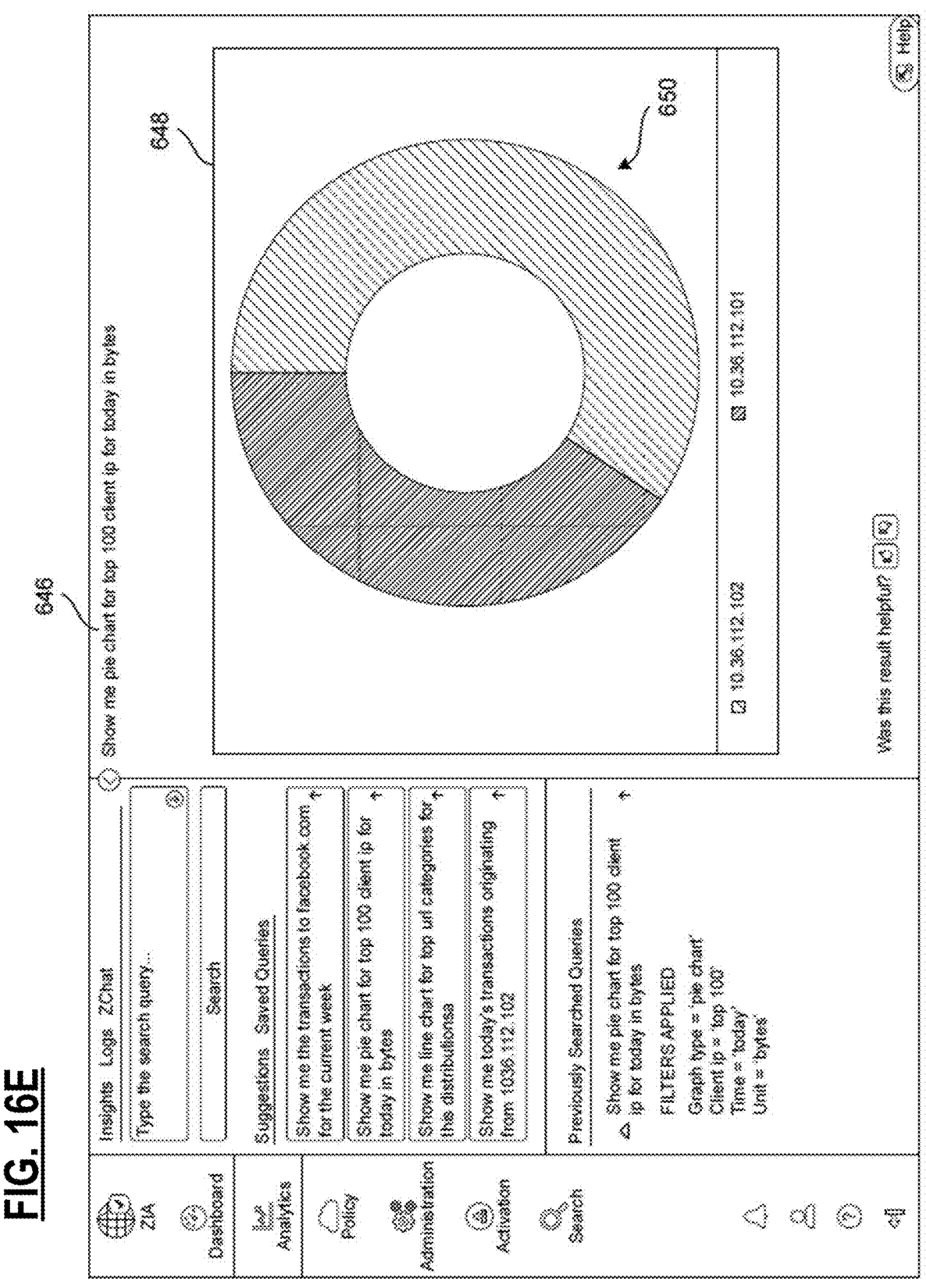

Next, the user may enter a recognizable request, such as "show me pie chart for top 100 client IP for today in bytes," as shown in FIG. 16D. Then, the query system can retrieve the log information and display it on the page, as shown in FIG. 16E. In this embodiment, the user request 646, which had been entered in the box 642, may also be presented on the page 648 with the results 650 (e.g., pie chart).

Therefore, the systems and methods of the present disclosure include a rule based engine (e.g., rule-based engine 546), which may be part of the user query system 528. This may be developed on top of a Core NLP library. The query string may be passed to this engine. The rule-based engine can use the Core NLP library's embedded NLP training models inside the cloud-based system 100 (e.g., Zscaler Cloud) along with network security systems (e.g., Zscaler products), which may define custom rules to process the query and generate a JSON response with a list of all the filters that map to the query string. This JSON response is used to query the SM 510 to return the Web Insights data. Depending on the type of query, the UI may render the logs which can give the user (admin) a detailed view of the transactions or may display an aggregated view of the data in the form of different charts, as described in the various UI workflows of FIGS. 10-16.

Additional Features

It should be noted that the embodiments of the present disclosure are configured to add significant value in the field of data retrieval for an enterprise, particularly for securely retrieving user logs from a secure domain of the enterprise without risking exposure by outside hackers. The present embodiments are configured to take generative AI to the next level by allowing organizations to ask questions about their own data in the form of queries without any sensitive information leaving their environment. The chat tool has the potential to dramatically accelerate business workflows. For example, CISOs and CIOs can get some urgent questions answered at any time, such as on a weekend afternoon without bugging their teams. The chat tool may play an increasing role with respect to other security products to deliver a secure digital transformation infrastructure to customers with reliability, availability, and serviceability.

The chat-based report generation may utilize OpenAI. For instance, OpenAI is configured to provide API based integration (e.g., using an API key) and Internet data based non deterministic training model. Also, models can be trained with custom data with OpenAI. Multiple processing techniques may be available, such as text completion, Q/A generation, classification, etc. Also, the models may use keyword extraction techniques.

In some embodiments, the chat features (e.g., the chat tool) may have use cases that are specific to private databases and particularly to databases that are associated with network security systems and methods to allow only authorized users (admins) to retrieve specific network data.

Conventional systems normally do not include Internet training data that can be used by OpenAI and may not be useful for certain chat requirements. Also, conventional systems may use training data that includes customer data that can be shared over Web and may be exposed to unauthorized users (e.g., hackers). Normally, there is no support for deterministic modeling and keyword tagging. Also, there is currently no support for processing various types of time phrases (e.g., "today," "last week," etc.). Nevertheless, the embodiments of the present disclosure are configured to overcome these deficiencies and provide useful and secure query searching using various filters and aspects to narrow down searches using a timeframe, specific units, display type, etc.

Regarding the Stanford Core NLP library that may be used in the present disclosure, the Core NLP library may be a Java library, may be open source, and may support multiple languages (e.g., Arabic, Chinese, English, French, German, Hungarian, Italian, Spanish, etc.). The Core NLP library may provide Java API integration and may be available on Maven Repo.

The features of this library may include a rule-based deterministic model, may include Name Entity Recognition (NER) and mapping to custom NER tags. Also, the library may include Regular Expression (Regex) rules for defining entities. The library may also include SUTime functionality for time phrase recognition (e.g., "today," "previous month," "last week," etc.).

The embodiments of the query systems and methods described in the present disclosure may include various designs needed to perform the functionality described herein. For example, the systems may include management functionality (e.g., Zmanage) which may include API integrating of the Core NLP library to convert text queries to report requests. Text processing in API may include Regex rules incorporated in a file, which can be created with reporting specific NER tags. Text queries may be processed by the library to generate entities using this rule file. Generated entities may then be processed by API to create report requests. Also, the libraries may be configured to support dynamic filters to get dynamic filter entity. API internally gets organization data using other Zmanage APIs, for instance.

The following filters may be supported in the API:
Top n queries: Web Application, URL Category, Threat Category, Client IP, Threat name, User, Location, Department, Advanced Threat Type, App Class, URL Class, etc.
Search filters: User, Location, Department, Protocol, Client IP, Server IP, Advanced Threat Categories, URL Search, Threat Category, URL Category, SSL Policy Reason, Threat Super Category, URL Class, etc.
Operations supported: Equals, Not equals
It may be noted that, for dynamic filters, values may be enclosed in double quotes, such as users: "user1," "user2," etc.

The embodiments of the present disclosure may use AI/ML in several areas, such as those shown in the main headings. The security models may be configured to catch, on a daily basis, hard-to-detect evasive threats. These models may detect things that most security scanners would not detect.

Intelligent policies incorporated in the present systems and methods may help customers to reduce their lateral propagation risk and improve their segmentation maturity. Also, the present embodiments may have AI/ML models for helping with cloud resiliency, where the systems can proactively detect data center issues, which may be part of ZDX.

Generative AI is a pivotal moment in the AI space. With the systems and methods described herein, customers may be able to embrace generative AI using the query systems. In some cases, innovations may be incorporated in a security platform (e.g., Zscaler platform) to perform breach prediction, monitor LLMs, global cloud intelligence, Co-pilot use cases where systems improve productivity and efficiency.

Customers can get Web Insights from a data log. In the past, a user would have to learn how to use the AI depending on what kinds of filters there are and where to find the right filters and then apply it to get the information they need. Now, the systems and methods of the present disclosure are configured to make it easier. That is, a customer can ask questions directly to this conversational UI.

With a request entered in the search box and the user hitting Enter, the LLM is configured to go to work generating the query on the backend. By the way, there may be trillions of user transactions that can be captured, from which the search query pulls from. Currently, there are no other systems in the world that can come close to this capability. Indeed, the query systems of the present disclosure are configured to handle this scale. The systems are built on top of the existing data platform that the cloud security provider currently operates. It has been found that the present embodiments are able to already scale to this level.

Search Method

FIG. 17 is a flow diagram illustrating an embodiment of a method 680 for performing a search query. As shown in FIG. 17, the method 680 includes the step of receiving a search request from an authorized user associated with an enterprise, as indicated in block 682. The search request includes natural language and is received via a query input element (e.g., search query box 584) of a User Interface (UI). Furthermore, the method 680 includes the step of parsing the search request to convert the natural language into one or more search parameters and a display format, as indicated in block 684. The method 680 also includes the step of retrieving log data from a private database associated with the enterprise, as indicated in block 686. The log data is retrieved in accordance with the one or more search parameters and is related to network activities associated with the enterprise. Also, the method 680 includes the step of displaying the log data on the UI in accordance with the display format, as indicated in block 688.

In some embodiments, the log data may include one or more of end user transactions, network security issues, and data traffic characteristics. It should be noted that the end users may include any employees and/or contractors associated with the enterprise, where the admin may be distinguished from the end users. Also, the query field of the UI may be configured to receive the search request by one or both of textual input and voice input, and wherein the instructions further cause the one or more processing devices to utilize a Natural Language Processing (NLP) technique for converting the voice input into text.

The one or more search parameters, for example, may include one or more of a timeframe during which the network activities occurred, a type of the network activities, a range of the network activities, and a unit of measure of the network activities. The display format, for example, may include one of a list, a table, a graph, a pie chart, and a bar graph. In some embodiments, the step of retrieving the log data from the private database may include maintaining the transmission of the log data within an environment of the enterprise to reduce a risk of interception by an outside entity.

According to some implementations, the method 680 may operate with a tracking and recording system, which may be configured to continuously track and record end user transactions, network activities, and data traffic. Also, the method 680 may operate with a pre-processing system, which may be configured to analyze the log data, learn patterns about the log data, organize the log data based on predetermined factors, distill insights into the log data, and summarize and store the patterns to enhance searchability. The method 680, in some embodiments, may include the step of storing one or more previously searched queries and one or more suggested queries. The method 680 may also display the one or more previously searched queries and one or more suggested queries on the UI for selection by the authorized user.

In some embodiments, the method 680 may use generative Artificial Intelligence (generative AI) to parse the search request and retrieve the log data. The method 680 may include execution by the UI, an Application Programming Interface (API), and a rule-based engine to process the natural language for interpreting the search request and to filter the search request according to searchable characteristics of the private database. In some cases, the method 680 along with the private database may be incorporated in a cloud-based network security server.

In some embodiments, the database may include security type information (log data) retrieved or logged by a security cloud-based server that monitors the user activity. A querying and displaying engine may be implemented as an API that works with the security software. The log data, in some embodiments, may include records (or counters) having an identifier and a value, wherein the identifier may be configured to identify the user, user's device, or IP address. The value may represent location information.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium configured to store computer logic having instructions that, when executed, cause one or more processing devices to:

receive a search request from an authorized user associated with an enterprise, wherein the search request includes natural language and is received via a query input element of a User Interface (UI);

parse the search request by applying a generative Artificial Intelligence (AI) model in combination with a deterministic rule-based engine, including mapping portions of the search request to enterprise-specific identifiers stored as embeddings in a vector database, to convert the natural language into one or more search parameters and a display format;

retrieve log data from a secure private database associated with the enterprise, wherein the secure private database is accessible only through a zero-trust cloud security service and stores network transaction records compressed in sparse representation, wherein the log data is retrieved in accordance with the one or more search parameters and is related to network activities associated with the enterprise;

display the log data on the UI in accordance with the display format; and present on the UI a Filters Applied view showing the one or more search parameters automatically derived from the search request, and accept user feedback modifying the parameters for refining subsequent queries.

2. The non-transitory computer-readable medium of claim 1, wherein the log data includes one or more of end-user transactions, network security issues, application usage insights, and data traffic characteristics.

3. The non-transitory computer-readable medium of claim 1, wherein the query input element of the UI is configured to receive the search request via textual input from the authorized user and/or voice input from the authorized user, and wherein the instructions further cause the one or more processing devices to utilize a Natural Language Processing (NLP) technique with an error-correcting rule-based engine for converting the voice input into text.

4. The non-transitory computer-readable medium of claim 1, wherein the one or more search parameters include one or more of a timeframe during which the network activities occurred, a type of the network activities, a quantitative range of the network activities, and a unit of measure of the network activities, and wherein the display format includes one of a table, a line graph, a pie chart, a list, and a bar graph, and wherein the UI provides a Filters Applied display presenting the timeframe, type, range and unit for user validation.

5. The non-transitory computer-readable medium of claim 1, wherein retrieving the log data from the private database includes maintaining all transmissions of the log data within the enterprise security cloud to reduce a risk of interception by an outside entity.

6. The non-transitory computer-readable medium of claim 1, further comprising a tracking and recording system, wherein the instructions further cause the one or more processing devices to utilize the tracking and recording system to continuously track and record end user transactions, network activities, and data traffic, the recorded data being stored in compressed sparse representations.

7. The non-transitory computer-readable medium of claim 1, further comprising a pre-processing system, wherein the instructions further cause the one or more processing devices to utilize the pre-processing system to analyze the log data, learn patterns about the log data, organize the log data based on predetermined factors, distill insights into the log data, and summarize and store the patterns to enhance searchability, wherein the pre-processing system employs machine learning models trained on sparsely populated enterprise log records.

8. The non-transitory computer-readable medium of claim 1, wherein the instructions further cause the one or more processing devices to:

store one or more previously searched queries and one or more suggested queries the suggested queries being generated using anonymized trends across multiple tenants of the cloud security service; and display the one or more previously searched queries and one or more suggested queries on the UI for selection by the authorized user.

9. The non-transitory computer-readable medium of claim 1, wherein the instructions further cause the one or more processing devices to use a generative Artificial Intelligence (generative AI) model together with an enterprise-specific embedding model that converts natural language portions into log identifiers used by the secure private database.

10. The non-transitory computer-readable medium of claim 1, further comprising an Application Programming Interface (API) and a rule-based engine configured to operate with the UI to process the natural language, to correct misinterpreted terms, and to filter the search request according to searchable characteristics of the private database.

11. The non-transitory computer-readable medium of claim 1, wherein the non-transitory computer-readable medium and the secure private database are incorporated in a cloud-based network security server.

12. A system comprising:

a processing device, and a memory device configured to store a computer program having instructions that, when executed, enable the processing device to receive a search request from an authorized user associated with an enterprise, wherein the search request includes natural language and is received via a query input element of a User Interface (UI), parse the search request by applying a generative Artificial Intelligence (AD) model in combination with a rule-based deterministic engine, including mapping the search request to enterprise-specific identifiers stored as embeddings in a vector database, to convert the natural language into one or more search parameters and a display format, retrieve log data from a secure private database associated with the enterprise, wherein the secure private database is hosted within a zero-trust security cloud and restricted from external access, wherein the log data is retrieved in accordance with the one or more search parameters and is related to network activities associated with the enterprise, and display the log data on the UI in accordance with the display format, including a Filters Applied section configured to present the search parameters and receive feedback for modification.

13. The system of claim 12, wherein the log data includes one or more of end user transactions, network security issues, application usage insights, and data traffic characteristics.

14. A method comprising the steps of:

receiving a search request from an authorized user associated with an enterprise, wherein the search request includes natural language and is received via a query input element of a User Interface (UI);

parsing the search request using a generative Artificial Intelligence (AI) model in combination with a rule-based deterministic filter and mapping the natural language to enterprise-specific identifiers using a vector database of embeddings, to convert the natural language into one or more search parameters and a display format;

retrieving log data from a secure private database associated with the enterprise, wherein the log data is retrieved in accordance with the one or more search parameters and is related to network activities associated with the enterprise, wherein the secure private database is maintained in a zero-trust cloud security service, restricted to authorized enterprise users, and stores transaction records in compressed sparse form; and displaying the log data on the UI in accordance with the display format, including displaying a Filters Applied list showing the search parameters automatically derived from the natural language request.

15. The method of claim 14, wherein the query input element of the UI is configured to receive the search request by one or both of textual input and voice input, further comprising the step of utilizing a Natural Language Processing (NLP) technique with an error-correcting rule-based engine for converting the voice input into text.

16. The method of claim 14, wherein the one or more search parameters include one or more of a timeframe during which the network activities occurred, a type of the network activities, a range of the network activities, and a unit of measure of the network activities, and wherein the display format includes one of a list, a table, a line graph, a pie chart, and a bar graph, and wherein the Filters Applied list presents he search meters re to the user for confirmation.

17. The method of claim 14, wherein the step of retrieving the log data from the private database includes maintaining transmissions of the log data exclusively within the enterprise security cloud environment to reduce a risk of interception by an outside entity.

18. The method of claim 14, further comprising the step of utilizing a cloud-based network security server to:

continuously track and record end user transactions, network activities, and data traffic;

continuously analyze the log data and learn patterns about the log data;

organize the log data based on predetermined factors;

distill insights into the log data; and summarize and store the patterns to enhance searchability, wherein the analysis employs compression techniques for sparsely populated log records.

19. The method of claim 14, further comprising the steps of:

storing one or more previously searched queries and one or more suggested queries, the suggested queries being generated from anonymized cross-tenant usage trends; and displaying the one or more previously searched queries and one or more suggested queries on the UI for selection by the authorized user.

20. The method of claim 14, further comprising the steps of:

processing the natural language for interpreting the search request; and filtering the search request according to searchable characteristics of the private database;

wherein the processing and filtering steps include combined use of generative Artificial Intelligence with deterministic NLP filters and enterprise-specific vector embeddings.

\* \* \* \* \*